United States Patent
Sugamata et al.

(10) Patent No.: US 11,433,333 B2
(45) Date of Patent: Sep. 6, 2022

(54) ELECTRETIZED SHEET AND FILTER

(71) Applicant: YUPO CORPORATION, Tokyo (JP)

(72) Inventors: Yutaro Sugamata, Ibaraki (JP); Hiroshi Koike, Ibaraki (JP); Seiichiro Iida, Tokyo (JP)

(73) Assignee: YUPO CORPORATION, Tokyo (JP)

( * ) Notice: Subject to any disclaimer, the term of this patent is extended or adjusted under 35 U.S.C. 154(b) by 0 days.

(21) Appl. No.: 17/040,782

(22) PCT Filed: Mar. 27, 2019

(86) PCT No.: PCT/JP2019/013164
§ 371 (c)(1),
(2) Date: Sep. 23, 2020

(87) PCT Pub. No.: WO2019/189349
PCT Pub. Date: Oct. 3, 2019

(65) Prior Publication Data
US 2021/0001255 A1 Jan. 7, 2021

(30) Foreign Application Priority Data

Mar. 30, 2018 (JP) .............................. JP2018-068731
Jul. 31, 2018 (JP) .............................. JP2018-143512

(51) Int. Cl.
*B01D 39/16* (2006.01)
*B01D 46/00* (2022.01)
(Continued)

(52) U.S. Cl.
CPC ..... *B01D 39/1676* (2013.01); *B01D 46/0032* (2013.01); *B01D 46/526* (2013.01);
(Continued)

(58) Field of Classification Search
CPC ............ B01D 39/1676; B01D 46/0032; B01D 46/526; B01D 2239/0668; B03C 3/28;
(Continued)

(56) References Cited

U.S. PATENT DOCUMENTS 4,789,504 A * 12/1988 Ohmori .............. B01D 39/1623
264/436
9,381,724 B2 * 7/2016 Koike ..................... B32B 27/16
(Continued)

FOREIGN PATENT DOCUMENTS

EP    2 479 024      7/2012
EP    3 260 294     12/2017
(Continued)

OTHER PUBLICATIONS

International Search Report issued in International Patent Application No. PCT/JP2019/013164, dated Jun. 25, 2019, along with an English translation thereof.
(Continued)

*Primary Examiner* — Hai Vo
(74) *Attorney, Agent, or Firm* — Greenblum & Bernstein, P.L.C.

(57) ABSTRACT

The electret-treated sheet includes: a core layer (A) which is a porous film containing at least a thermoplastic resin; a surface layer (X) disposed on one side of the core layer (A); and a back surface layer (Y) disposed on the other side of the core layer (A), the surface layer (X) and the back surface layer (Y) each having a charged outermost surface, wherein the electret-treated sheet has a water vapor permeability coefficient of 0.1 to 2.5 g·mm/m²·24 hr; the core layer (A) has a pore aspect ratio of 5 to 50 and an average pore height of 2.5 to 15 μm; the surface layer (X) and the back surface layer (Y) each have a thickness of 5 to 200 μm; and the surface layer (X) includes a heat seal layer (B) including the
(Continued)

outermost surface, wherein the heat seal layer (B) has a melting point of 50 to 140° C.

7 Claims, 4 Drawing Sheets

(51) Int. Cl.

| | |
|---|---|
| *B01D 46/52* | (2006.01) |
| *B03C 3/28* | (2006.01) |
| *B03C 3/47* | (2006.01) |
| *B32B 3/28* | (2006.01) |
| *B32B 5/18* | (2006.01) |
| *B32B 27/06* | (2006.01) |
| *B32B 27/20* | (2006.01) |
| *B32B 27/32* | (2006.01) |

(52) U.S. Cl.
CPC ............... *B03C 3/28* (2013.01); *B03C 3/47* (2013.01); *B32B 3/28* (2013.01); *B32B 5/18* (2013.01); *B32B 27/065* (2013.01); *B32B 27/20* (2013.01); *B32B 27/32* (2013.01); *B01D 2239/0435* (2013.01); *B01D 2239/1208* (2013.01); *B01D 2239/1258* (2013.01); *B01D 2275/10* (2013.01); *B01D 2275/30* (2013.01); *B32B 2250/242* (2013.01); *B32B 2250/40* (2013.01); *B32B 2264/302* (2020.08); *B32B 2264/303* (2020.08); *B32B 2266/025* (2013.01); *B32B 2266/10* (2016.11); *B32B 2307/20* (2013.01); *B32B 2307/31* (2013.01); *B32B 2307/516* (2013.01); *B32B 2307/724* (2013.01)

(58) Field of Classification Search
CPC ........... B03C 3/47; B32B 5/18; B32B 27/065; B32B 27/20; B32B 2307/31
See application file for complete search history.

(56) References Cited

U.S. PATENT DOCUMENTS

| | | |
|---|---|---|
| 10,010,892 B2 | 7/2018 | Koike et al. |
| 2012/0177907 A1 | 7/2012 | Koike et al. |
| 2016/0250649 A1* | 9/2016 | Koike ................ B01D 46/0032 96/74 |
| 2018/0036934 A1 | 2/2018 | Iwase et al. |

FOREIGN PATENT DOCUMENTS

| | | |
|---|---|---|
| JP | 2000-218112 A | 8/2000 |
| JP | 2002-102625 A | 4/2002 |
| JP | 2008-18350 A | 1/2008 |
| JP | 2010-23502 A | 2/2010 |
| JP | 2010-89494 A | 4/2010 |
| JP | 2010-89495 A | 4/2010 |
| JP | 2015-98022 A | 5/2015 |

OTHER PUBLICATIONS

Written Opinion issued in international Patent Application No. PCT/JP2019/013164, dated Jun. 25, 2019, along with an English translation thereof.
Extended European Search Report issued in Application No. 19776907.8, dated Nov. 11, 2021.
China Office Action issued in CN Application No. 201980021175.1, dated Jan. 27, 2022 and English translation thereof.

* cited by examiner

ELECTRETIZED SHEET AND FILTER

TECHNICAL FIELD

The present invention relates to an electret-treated sheet and a filter.

BACKGROUND ART

Filters having an electret-treated sheet have heretofore been known as filters collecting foreign matter, such as dust and dirt, in air. For example, a filter in which an electret-treated sheet processed into a wave shape by corrugation and a flat plate-like electret-treated sheet are alternately laminated is disclosed, wherein the filter has a cross-sectional ratio of a flow path within a specific range (see, for example, Patent Literature 1).

A non-woven fabric made of a resin, such as polypropylene, which stores charge by a charging treatment has been proposed as the electret-treated sheet described above (see, for example, Patent Literature 2). Also, an electrostatic adsorption film having pores in the inside has a structure that easily retains charge, and can therefore be used as the electret-treated sheet adsorbing dust, etc. through electrostatic force (see, for example, Patent Literature 3).

CITATION LIST

Patent Literature

Patent Literature 1: Japanese Patent Laid-Open No. 2015-098022
Patent Literature 2: Japanese Patent Laid-Open No. 2008-018350
Patent Literature 3: Japanese Patent Laid-Open No. 2010-023502

SUMMARY OF INVENTION

Technical Problem

In an electret-treated sheet, polarization generally occurs in the inside of the sheet by the electret treatment so that electrons and holes move to the surface to cause electrostatic force. Hence, when a dirty filter ascribable to use is washed, surface charge may disappear due to a washing solution such as water, resulting in a reduced dust collecting effect.

In response to this, the electret-treated sheet disclosed in Patent Literature 2 seeks to improve water resistance through the fixation of a film having water resistance to the surface. However, a film for surface protection must be further established, leading to increase in filter cost.

Furthermore, laminated electret-treated sheets in a filter are attached to each other with an adhesive such as a paste. Hence, upon washing, the filter structure may collapse because a washing solution separates the adhesive therefrom. Moreover, chargeability tends to be reduced due to the influence of polar groups, which are carried by many adhesives.

An object of the present invention is to provide an electret-treated sheet and a filter which have little reduction in chargeability after washing and little separation between sheets, and are excellent in water resistance.

Solution to Problem

The present inventors have conducted diligent studies to attain the object and consequently completed the present invention by finding that the object can be attained by establishing a relatively thick resin layer on both sides of a porous film containing a thermoplastic resin, and establishing a heat seal layer (B) having a melting point within a specific range on at least one outermost surface of the resin layer.

Specifically, the present invention is as follows.

(1) An electret-treated sheet comprising:
a core layer (A) which is a porous film containing a thermoplastic resin;
a surface layer (X) disposed on one side of the core layer (A); and a back surface layer (Y) disposed on the other side of the core layer (A),
the surface layer (X) and the back surface layer (Y) each having a charged outermost surface, wherein:
the electret-treated sheet has a water vapor permeability coefficient of 0.1 to 2.5 g·mm/m$^2$·24 hr;
the core layer (A) has a pore aspect ratio of 5 to 50 and an average pore height of 2.5 to 15 µm;
the surface layer (X) and the back surface layer (Y) each have a thickness of 5 to 200 µm; and
the surface layer (X) comprises a heat seal layer (B) comprising the outermost surface, wherein
the heat seal layer (B) has a melting point of 50 to 140° C.

(2) The electret-treated sheet according to (1), wherein the number of pore interfaces of the core layer (A) is 50 to 1000 interfaces/mm.

(3) The electret-treated sheet according to (1) or (2), wherein
the thermoplastic resin contained in the core layer (A) is polyolefin resin.

(4) The electret-treated sheet according to any of (1) to (3), wherein
the heat seal layer (B) is a resin film containing low-density polyethylene.

(5) The electret-treated sheet according to any of (1) to (4), wherein
the core layer (A) contains 0.07 to 10% by mass of metal soap.

(6) The electret-treated sheet according to any of (1) to (5), wherein
the electret-treated sheet is a film stretched at least in a uniaxial direction.

(7) The electret-treated sheet according to any of (1) to (6), wherein
the core layer (A) contains at least one selected from an inorganic filler and an organic filler, wherein
the inorganic filler and the organic filler have a volume-average particle size of 0.1 to 30 µm.

(8) A filter comprising an air flow path, wherein
a corrugated plate-like electret-treated sheet which is an electret-treated sheet according to any of (1) to (7) and a flat plate-like electret-treated sheet which is an electret-treated sheet according to any of (1) to (7) are alternately laminated, and
the filter has a joint at which the laminated electret-treated sheets are thermally fused to each other.

Advantageous Effects of Invention

The present invention can provide an electret-treated sheet and a filter which have little reduction in chargeability after washing and little separation between sheets, and are excellent in water resistance.

DESCRIPTION OF EMBODIMENTS

Hereinafter, the electret-treated sheet and the filter of the present invention will be described in detail. However, the description of components described below is given for illustrating one exemplary embodiment (typical example) of the present invention, and the present invention is not limited by the contents thereof.

In the description below, the term "(meth)acrylic" refers to both acrylic and methacrylic. A numerical range represented using the term "to" means a range including numerical values described before and after the term "to" as the lower limit value and the upper limit value.

(Electret-Treated Sheet)

The electret-treated sheet of the present invention comprises: a core layer (A) which is a porous film containing a thermoplastic resin; a surface layer (X) disposed on one side of the core layer (A); and a back surface layer (Y) disposed on the other side of the core layer (A). The surface layer (X) and the back surface layer (Y) each have a charged outermost surface. The surface layer (X) has a heat seal layer (B) comprising its outermost layer. In the electret-treated sheet of the present invention, the back surface layer (Y) can also have a heat seal layer (B) comprising its outermost layer.

The electret-treated sheet of the present invention is less subject to charge transfer to the outside of the electret-treated sheet from the surfaces of the core layer (A) even by the attachment of a washing solution to the surfaces, because the surface layer (X) and the back surface layer (Y) cover the surfaces of the core layer (A). Thus, reduction in chargeability after washing can be suppressed. Furthermore, electret-treated sheets can be thermally fused to each other and joined together by the heat seal layer (B) constituting the outermost layer of the surface layer (X). The sheets can be strongly joined together and also exhibit excellent durability against a washing solution. Therefore, the electret-treated sheet of the present invention has little separation between sheets after washing. A filter comprising the electret-treated sheet of the present invention having such excellent water resistance may be reused by washing, if getting dirty.

The surface layer (X) of the electret-treated sheet of the present invention may be a single layer consisting of the heat seal layer (B), or may be multiple layers having the heat seal layer (B) in the outermost layer and having an intermediate layer (C) between the core layer (A) and the heat seal layer (B), i.e., a surface layer (X) comprising an intermediate layer (C) and the heat seal layer (B). In the latter case, the intermediate layer (C) is capable of increasing the thickness of the surface layer (X) and decreasing charge transfer from the core layer (A).

Figure 1:
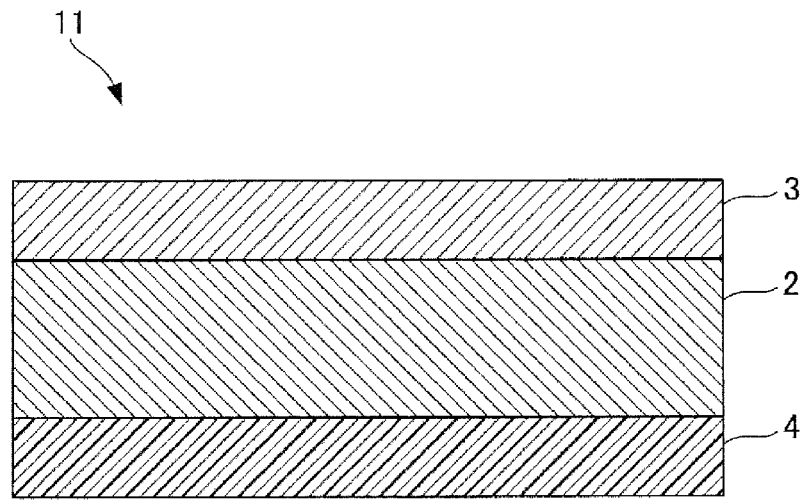
FIG. 1 is a cross-sectional view showing the configuration of an electret-treated sheet according to one embodiment of the present invention.

FIG. 1 shows the configuration of electret-treated sheet 11 according to one embodiment of the present invention.

As shown in FIG. 1, the electret-treated sheet 11 has core layer 2, heat seal layer 3 and back surface layer 4. The heat seal layer 3 is laminated on one side of the core layer 2, and the back surface layer 4 is laminated on the other side of the core layer 2. In this example of the electret-treated sheet 11, the surface layer (X) consists of the heat seal layer (B).

Figure 2:
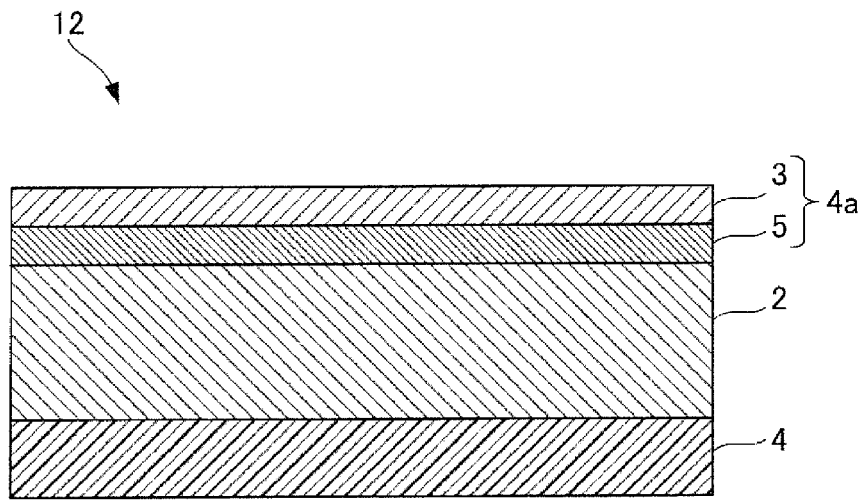
FIG. 2 is a cross-sectional view showing the configuration of an electret-treated sheet according to another embodiment of the present invention.

FIG. 2 shows the configuration of electret-treated sheet 12 according to another embodiment.

As shown in FIG. 2, the electret-treated sheet 12 has core layer 2, and surface layer 4a and back surface layer 4 laminated on both sides, respectively, of the core layer 2. The surface layer 4a has heat seal layer 3 as an outermost layer on one side of the core layer 2, and has intermediate layer 5 between the core layer 2 and the heat seal layer 3. In this example of the electret-treated sheet 12, the surface layer (X) consists of the heat seal layer (B) and the intermediate layer (C).

<Core Layer (A)>

The core layer (A) is a porous film containing at least a thermoplastic resin, as mentioned above. The core layer (A) is charged by retaining charge on the surface or in the inside by the electret treatment, and imparts electrostatic adsorption force for adsorbing foreign matter such as dust and dirt to the electret-treated sheet.

<<Thermoplastic Resin>>

The thermoplastic resin that can be used in the core layer (A) is not particularly limited. A thermoplastic resin excellent in insulating properties is preferred because charge stored in the inside of the core layer (A) is easily retained therein.

Examples of the thermoplastic resin for use in the core layer (A) include:
polyolefin resin such as polyethylene resin, polypropylene resin, polybutene, and 4-methyl-1-pentene (co)polymers;
functional group-containing olefin resin such as ethylene-vinyl acetate copolymers, ethylene-(meth)acrylic acid copolymers, metal salts (ionomers) of ethylene-(meth)acrylic acid copolymers, ethylene-(meth)acrylic acid alkyl ester copolymers (the number of carbon atoms of the alkyl group is preferably 1 to 8), maleic acid-modified polyethylene, and maleic acid-modified polypropylene;
polyester resin such as aromatic polyester (polyethylene terephthalate, polybutylene terephthalate, polyethylene naphthalate, etc.) and aliphatic polyester (polybutylene succinate, polylactic acid, etc.);
polyamide resin such as nylon-6, nylon-6,6, nylon-6,10, and nylon-6,12;
styrene resin such as syndiotactic polystyrene, atactic polystyrene, acrylonitrile-styrene (AS) copolymers, styrene-butadiene (SBR) copolymers, and acrylonitrile-butadiene-styrene (ABS) copolymers;
polyvinyl chloride resin;
polycarbonate resin; and
polyphenylene sulfide.

Examples of the polyethylene resin include low-density polyethylene, medium-density polyethylene, high-density polyethylene, linear low-density polyethylene, low-crystallinity or amorphous ethylene-α-olefin copolymers, and ethylene-cyclic olefin copolymers.

Examples of the polypropylene resin include crystalline polypropylene, low-crystallinity polypropylene, amorphous polypropylene, propylene-ethylene copolymers (random copolymers or block copolymers), propylene-α-olefin copolymers, and propylene-ethylene-α-olefin copolymers, etc.).

The α-olefin is not particularly limited as long as the α-olefin is copolymerizable with ethylene and propylene. Examples thereof can include ethylene, propylene, 1-butene, 1-pentene, 1-hexene, 4-methyl-1-pentene, 1-heptene, and 1-octene.

Among these thermoplastic resins, polyolefin resin or functional group-containing olefin resin excellent in insulating properties and processability is preferred.

As the thermoplastic resin contained in the core layer (A), one selected from among the thermoplastic resins described above may be used alone, or two or more thus selected may be used in combination.

Among the polyolefin resins mentioned above, polypropylene resin is particularly preferred from the viewpoint of insulating properties, processability, water resistance, chemical resistance, cost, etc. The polypropylene resin is preferably blended, for use, with 2 to 25% by mass of a resin having a lower melting point than that of a propylene homopolymer with respect to the whole amount of the thermoplastic resin, from the viewpoint of film formability. Examples of such a resin having a lower melting point include polyethylene resin. Among others, high-density or low-density polyethylene is preferred.

The amount of the thermoplastic resin blended in the core layer (A) can be an amount excluding the content of an optional component mentioned later, and is preferably 50% by mass or more, more preferably 51% by mass or more, further preferably 60% by mass, because the core layer (A) is easily formed and the obtained core layer (A) easily retains charge owing to the insulating properties of the thermoplastic resin.

<<Pore-Forming Nucleating Agent>>

The core layer (A) preferably contains at least one selected from the group consisting of an inorganic filler and an organic filler. The inorganic filler or the organic filler contained therein forms pores (voids) in the core layer (A) and increases the interface (surface area) between the thermoplastic resin and air, thereby easily improving the chargeability of the core layer (A). Also, undulation (protrusion structure) attributed to the inorganic filler or the organic filler can be formed on the surface of the core layer (A) to roughen the surface of the core layer (A). The surface roughening can increase the surface area of the core layer (A) and increases the adsorption area of the electret-treated sheet, consequently enhancing the dust collecting effect of a filter.

Examples of the inorganic filler include heavy calcium carbonate, light calcium carbonate, baked clay, silica, diatomaceous earth, white earth, talc, titanium oxide, barium sulfate, silicon oxide, magnesium oxide, alumina, zeolite, mica, sericite, bentonite, sepiolite, vermiculite, dolomite, wollastonite, glass fiber, and inorganic particles obtained by the surface treatment of these inorganic fillers with a fatty acid, a polymer surfactant, an antistatic agent, or the like. Among them, heavy calcium carbonate, light calcium carbonate, baked clay or talc is preferred because of favorable pore formability and inexpensiveness.

In the case of adding the organic filler, organic particles are preferred which are immiscible with the thermoplastic resin serving as the principal component of the core layer (A), have a melting point or a glass transition temperature higher than that of the thermoplastic resin, and are finely dispersed under melt kneading conditions for the thermoplastic resin. When the thermoplastic resin is, for example, polyolefin resin, a material that is a polymer such as polyethylene terephthalate, polybutylene terephthalate, polycarbonate, nylon-6, nylon-6,6, cyclic polyolefin, polystyrene, or polymethacrylate, has a melting point (e.g., 170 to 300° C.) or a glass transition temperature (e.g., 170 to 280° C.) higher than that of the melting point of the polyolefin resin, and is immiscible with the polyolefin resin can be used as the organic filler.

The volume-average particle size of the inorganic filler or the organic filler is preferably 0.1 μm or larger, more preferably 1 μm, further preferably 3 μm or larger, from the viewpoint of the ease of pore formation in the core layer (A). On the other hand, the volume-average particle size of the inorganic filler or the organic filler is preferably 30 μm or smaller, more preferably 20 μm or smaller, further preferably 15 μm or smaller, from the viewpoint of improvement in the durability and chargeability of the core layer (A). Hence, the volume-average particle size of the inorganic filler is preferably 0.1 to 30 μm, more preferably 1 to m, further preferably 3 to 15 μm.

The volume-average particle size of the filler can be determined by observing a cut surface of the core layer (A) under an electron microscope, measuring the largest sizes of at least 10 particles, and regarding an average value thereof as the volume-average particle size of the filler dispersed in the thermoplastic resin by melt kneading and dispersion.

The amount of the inorganic filler or the organic filler blended in the core layer (A) is preferably 1% by mass or more, more preferably 5% by mass or more, from the viewpoint of pore formability in the core layer (A). Also, the amount of the filler blended is preferably 49% by mass or less, more preferably 40% by mass or less, from the viewpoint of the ease of control of the amount of the core layer (A) charged and the sustention of the dust collecting effect of a filter. Thus, the amount of the filler blended is preferably 1 to 49% by mass, more preferably 5 to 40% by mass.

<<Metal Soap>>

The core layer (A) can contain metal soap. Metal soap contained in a resin film has previously been thought to reduce charge retention performance and also to reduce heat resistance due to an elevated dielectric constant of the resin film. Nonetheless, the studies of the present inventors have revealed that metal soap thus contained can improve heat resistance without reducing chargeability. Specifically, the metal soap contained in the core layer (A) facilitates enhancing the charge retention performance of the core layer (A), and the electret-treated sheet obtained by the electret treatment of this core layer (A) easily suppresses reduction in the charge retention performance even when stored or used in a high-temperature environment. Also, this electret-treated sheet is preferred because the electret-treated sheet does not reduce charge retaining properties even when dried by heating after water washing.

It has been further revealed that the metal soap blended in an appropriate amount also enhances an effect of suppressing reduction in the chargeability of the resulting electret-treated sheet after water washing.

The metal soap suitable for use in the electret-treated sheet is preferably metal soap that is melted at a kneading stage for a raw material of the core layer (A) and uniformly dispersed in the thermoplastic resin, but is solid at an ambient temperature upon use or storage of the electret-treated sheet, because high charge retention performance is easily exerted. Hence, the melting point of the metal soap preferably falls within the range of 50° C. or higher and equal to or lower than a temperature higher by 50° C. than the melting point of the thermoplastic resin, more preferably falls within the range of 70° C. or higher and equal to or lower than a temperature higher by 40° C. than the melting point of the thermoplastic resin, and further preferably falls within the range of 100° C. or higher and equal to or lower than a temperature higher by 30° C. than the melting point of the thermoplastic resin. In the case of using, for example, a polypropylene resin having a melting point on the order of 160 to 170° C. as the thermoplastic resin, metal soap having a melting point of 50° C. to 220° C. is preferably used, metal soap having a melting point of 70° C. to 210° C. is more preferably used, and metal soap having a melting point of 100° C. to 200° C. is further preferably used.

The metal soap having a melting point that falls within the preferred temperature range mentioned above is melted during formation of the core layer (A) and uniformly dispersed in the thermoplastic resin. After the formation, this metal soap is solidified while keeping its dispersed state in the thermoplastic resin so that the metal soap is less likely to flow. Upon electret treatment, the metal soap is oriented through its intramolecular dipole. This orientation of the metal soap presumably enhances the charge retention performance of the electret-treated sheet.

The metal soap is preferably a metal salt of a fatty acid, more preferably a metal salt of a higher fatty acid. In this context, examples of the fatty acid include saturated fatty acid and unsaturated fatty acid having 5 to 30 carbon atoms, preferably 6 to 28 carbon atoms, more preferably 8 to 24 carbon atoms, further preferably 10 to 20 carbon atoms, and their structural isomers. These numbers of carbon atoms refer to the number of carbon atoms per molecule of the fatty acid.

Specific examples of the saturated fatty acid include, but are not particularly limited to, pentanoic acid, hexanoic acid, heptanoic acid, octanoic acid, nonanoic acid, decanoic acid, dodecanoic acid, tetradecanoic acid, pentadecanoic acid, hexadecanoic acid, heptadecanoic acid, octadecanoic acid, 12-hydroxyoctadecanoic acid, icosanoic acid, docosanoic acid, tetracosanoic acid, hexacosanoic acid, and octacosanoic acid.

Specific examples of the unsaturated fatty acid include, but are not particularly limited to, trans-2-butenoic acid, 9-tetradecenoic acid, 9-hexadecenoic acid, cis-6-hexadecenoic acid, cis-9-octadecenoic acid, trans-9-octadecenoic acid, cis-9-icosenoic acid, cis-13-docosenoic acid, cis-15-tetracosenoic acid, cis,cis-9,12-octadecadienoic acid, 9,11,13-octadecatrienoic acid, cis,cis,cis-9,12,15-octadecatrienoic acid, cis,cis,cis-8,11,14-icosatrienoic acid, 6,9,12,15-octadecatetraenoic acid, 5,8,10,12,14-octadecapentaenoic acid, and 4,7,10,13,16,19-docosahexaenoic acid.

Among these fatty acids, a metal salt of saturated fatty acid is preferred because the melting point tends to be high and an electret-treated sheet excellent in heat resistance tends to be easily obtained.

The metal element of the metal soap is not particularly limited as long as the metal forms a stable salt with the fatty acid. Usually, a monovalent, divalent or trivalent metal that is at least one of metal elements belonging to groups 1 to 13 (belonging to groups IA to IIIB in terms of the former group number) of the periodic table is preferably used, a divalent or trivalent metal that is at least one of metal elements of groups 2 to 13 (belonging to groups IIA to IIIB in terms of the former group number) of the periodic table is more preferably used, and at least one of metal elements of groups 2, 12 and 13 (of groups IIA, IIB and IIIB in terms of the former group number) of the periodic table is further preferably used, from the viewpoint of the melting point of the resulting metal soap and charge retention performance. More specifically, at least one of sodium (group 1), magnesium (group 2), calcium (group 2), barium (group 2), zinc (group 12) and aluminum (group 13) is further preferably used. Among them, at least one of calcium, zinc and aluminum is particularly preferably used from the viewpoint of safety. Calcium or aluminum is particularly preferably used, and aluminum is most preferably used, from the viewpoint of higher charge retention performance. The metal soap may be a basic salt.

The metal soap that is most preferably used in the electret-treated sheet of the present invention is saturated higher fatty acid aluminum salt. Specific examples of the saturated higher fatty acid aluminum salt include, but are not particularly limited to, dihydroxyaluminum octadecanoate, hydroxyaluminum dioctadecanoate, aluminum trioctadecanoate, dihydroxyaluminum dodecanoate, hydroxyaluminum didodecanoate, aluminum tridodecanoate, dihydroxyaluminum 2-ethylhexanoate, hydroxyaluminum di-2-ethylhexanoate, and aluminum tri-2-ethylhexanoate.

The metal soap is generally utilized as various additives, for example, a stabilizer, a lubricant, a filler dispersant, a gum inhibitor, a flowability improving agent, a nucleating agent, and an antiblocking agent, in the plastic industry. However, the metal soap in the electret-treated sheet of the present invention serves as an additive for augmenting the chargeability of the core layer (A) and is used, particularly, as an additive suppressing reduction in the chargeability of a conventional electret-treated sheet in a high-temperature environment. Hence, in the present invention which employs the metal soap for the purpose of suppressing reduction in chargeability, the metal soap is preferably added in an amount relatively larger than the amount of the metal soap blended (e.g., 0.01% by mass) for use as the conventional general additive mentioned above.

Thus, the content of the metal soap in the core layer (A) is preferably 0.07% by mass or more, more preferably 0.1% by mass or more, further preferably 0.2% by mass or more, particularly preferably 0.3% by mass or more, from the viewpoint of maintaining the ability to retain charge and suppressing reduction in chargeability after water washing.

On the other hand, the content of the metal soap in the core layer (A) is preferably 10% by mass or less, more preferably 5% by mass or less, further preferably 3% by mass or less, particularly preferably 1.0% by mass or less, most preferably 0.7% by mass or less, from the viewpoint of obtaining a sufficient effect of the metal soap while preventing the occurrence of bleedout, etc.

<<Other Additives>>

The core layer (A) can optionally contain an additive such as a heat stabilizer (antioxidant), a light stabilizer, a dispersant, or a lubricant. When the core layer (A) contains a heat stabilizer, its content is usually 0.001 to 1% by mass. Examples of the heat stabilizer include sterically hindered phenol, phosphorus, and amine stabilizers. When the core layer (A) employs a light stabilizer, its content is usually 0.001 to 1% by mass. Examples of the light stabilizer include sterically hindered amine, benzotriazole, and benzophenone light stabilizers. The dispersant or the lubricant can be used for the purpose of dispersing, for example, the inorganic filler or the organic filler. The amount of the dispersant or the lubricant used usually falls within the range of 0.01 to 4% by mass. Examples of the dispersant or the lubricant include silane coupling agents, higher fatty acids such as oleic acid and stearic acid, polyacrylic acid, polymethacrylic acid, and salts thereof.

<<Multi-Layer Structure>>

The core layer (A) may have a single-layer structure or may have a multi-layer structure.

The core layer (A) having a multi-layer structure is capable of conferring various functions such as improvement in voltage resistance performance when charge is injected by the electret treatment, improvement in the function of sealing off the injected charge so as not to escape to the outside, secondary processing suitability such as joining together of electret-treated sheets, and antistatic properties.

<<Film Formation>>

The core layer (A) is preferably shaped into a film by extrusion. Examples of the extrusion include sheet forming which involves melt-kneading a raw material of the core layer (A) in an extruder set to a temperature higher than the melting point or glass transition temperature of the core layer (A), extruding the kneaded product into a sheet using a T-die, an I-die, or the like, and cooling the extrudate using a metal roll, a rubber roll, a metal belt, or the like, and inflation molding which involves extruding the raw material into a tube using an annular die, and inflating the tube at a fixed ratio through the internal pressure of the tube while cooling the tube in air or water. For the sheet forming of the core layer (A), the surface may be roughened by using a roll having a surface asperity shape as the metal roll or rubber roll for cooling. The roughening increases the adsorption area of the electret-treated sheet and improves the dust collecting effect of a filter.

Examples of the method for shaping the core layer (A) having a multi-layer structure include a multi-layer die system using a feed block and a multi-manifold, and an extrusion lamination system using a plurality of dies. A multi-layer die system and an extrusion lamination system may be combined.

<<Stretching>>

The core layer (A) is preferably a stretched film obtained by stretching at least in a uniaxial direction. The stretching of the resin film can be performed by any of various methods usually used. When the core layer (A) is a single layer, this layer is preferably a layer formed by uniaxial stretching or biaxial stretching. When the core layer (A) has a multi-layer structure, examples thereof include those having a laminated structure where the number of respective stretching axes of the layers is uniaxial/uniaxial, uniaxial/biaxial, uniaxial/uniaxial/biaxial, uniaxial/biaxial/uniaxial, uniaxial/biaxial/biaxial, biaxial/biaxial/biaxial, or the like.

Examples of the stretching method include longitudinal stretching utilizing difference in peripheral speed among roll groups, lateral stretching using a tenter oven, sequential biaxial stretching based on the combination of longitudinal stretching and lateral stretching, rolling, simultaneous biaxial stretching based on the combination of a tenter oven and a linear motor, and simultaneous biaxial stretching based on the combination of a tenter oven and a pantograph. Examples of the method for stretching an inflation film include simultaneous biaxial stretching by a tubular method. The longitudinal direction refers to the machine direction (MD) of a film, and the lateral direction refers to the transverse direction (TD) of a film.

The stretch ratio is not particularly limited and is appropriately determined in consideration of the properties, etc. of the thermoplastic resin for use in the core layer (A). For example, in the case of using a propylene homopolymer or a copolymer thereof as the thermoplastic resin, and uniaxially stretching the resin film, the stretch ratio is usually 1.2 to 12, preferably 2 to 10. For the biaxial stretching of this resin film, the stretch ratio is usually 1.5 to 60, preferably 4 to 50, in terms of an area ratio. In the case of uniaxially stretching a resin film containing any of other thermoplastic resins, the stretch ratio is usually 1.2 to 10, preferably 2 to 5. For the biaxial stretching of this resin film, the stretch ratio is usually 1.5 to 20, preferably 4 to 12, in terms of an area ratio.

The stretching temperature falls within the range of equal to or higher than the glass transition temperature of the thermoplastic resin principally used in the core layer (A) and equal to or lower than the melting point of a crystalline moiety, and the stretching can be performed within a temperature range known in the art to be suitable for the thermoplastic resin. Specifically, when the thermoplastic resin of the core layer (A) is, for example, a propylene homopolymer (melting point: 155 to 167° C.), the stretching temperature is 100 to 166° C. When the thermoplastic resin is high-density polyethylene (melting point: 121 to 136° C.), the stretching temperature is 70 to 135° C. In short, the stretching temperature is a temperature lower by 1 to 70° C. than the melting point. The stretching rate is preferably 20 to 350 μm/min.

<Surface Layer (X)>

The surface layer (X) is disposed on one side of the core layer (A) and has a function as a protective layer by which an electric dipole formed in the core layer (A) by a charging treatment is insusceptible to external influence such as dew condensation water. The surface layer (X) may be a single layer consisting only of a heat seal layer (B) mentioned later, or may have an intermediate layer (C) mentioned later between the core layer (A) and the heat seal layer (B). The intermediate layer (C) may be one layer or may be two or more layers.

<<Heat Seal Layer (B)>>

The heat seal layer (B) is positioned in the outermost layer of the surface layer (X), as mentioned above. This heat seal layer (B) can be thermally fused to another electret-treated sheet so that the electret-treated sheets are joined together.

The melting point of the heat seal layer (B) is 50° C. or higher, preferably 55° C. or higher. When the melting point is equal to or higher than the lower limit value, sticking to a roll or dirt on a roll is less likely to occur during sheet forming and during processing into a filter. Furthermore, the obtained filter is less likely to be deformed. Also, the melting point of the heat seal layer (B) is 140° C. or lower, preferably 120° C. or lower, more preferably 100° C. or lower. When the melting point is equal to or lower than the upper limit value, heat sealability is more favorable. Thus, a filter during a production process and the obtained filter more easily maintain their steric structures. Specifically, the melting point is 50 to 140° C., preferably 55 to 120° C., more preferably 55 to 100° C.

Examples of the material of the heat seal layer (B) that can be used include: polyolefin resin such as polyethylene resin, polypropylene resin, and polybutene; functional group-containing olefin resin such as ethylene-vinyl acetate copolymers, ethylene-(meth)acrylic acid copolymers, metal salts (ionomers) of ethylene-(meth)acrylic acid copolymers, ethylene-(meth)acrylic acid alkyl ester copolymers (the number of carbon atoms of the alkyl group is preferably 1 to 8), maleic acid-modified polyethylene, maleic acid-modified polypropylene, chlorinated polyethylene, and chlorinated polypropylene; and polyamide resin, polybutyral resin, and urethane resin. The material preferably has a melting point lower than that of the core layer (A).

Examples of the polyethylene resin include low-density polyethylene, medium-density polyethylene, high-density polyethylene, linear low-density polyethylene, low-crystallinity or amorphous ethylene-α-olefin copolymers, and ethylene-cyclic olefin copolymers.

The polypropylene resin is preferably a resin having relatively low crystallinity. Examples thereof include amorphous polypropylene, propylene-ethylene copolymers (random copolymers or block copolymers), propylene-α-olefin copolymers, and propylene-ethylene-α-olefin copolymers, etc.).

The α-olefin is not particularly limited as long as the α-olefin is copolymerizable with ethylene and propylene. Examples thereof can include ethylene, propylene, 1-butene, 1-pentene, 1-hexene, 4-methyl-1-pentene, 1-heptene, and 1-octene.

Among them, polyolefin resin having favorable chargeability is preferred. Low-density polyethylene or a propylene-ethylene copolymer (random copolymer or block copolymer) is more preferred, and low-density polyethylene is further preferred, from the viewpoint of improving thermal fusibility.

<<Intermediate Layer (C)>>

The intermediate layer (C) can be disposed as a portion of the surface layer (X) between the core layer (A) and the heat seal layer (B), as mentioned above. The intermediate layer (C) can adjust the thickness of the surface layer (X) and further suppress the surface charge transfer of the core layer (A). Furthermore, the charge retention performance of the core layer (A) can also be improved by adjusting the relative dielectric constant of the intermediate layer (C).

The intermediate layer (C) is a layer containing a thermoplastic resin. The thermoplastic resin is not particularly limited, and the same type of resin as in the core layer (A), specifically, polyolefin resin, is preferably used from the viewpoint of stretching properties. The intermediate layer (C) particularly preferably contains a resin having a melting point higher than that of the heat seal layer (B) mentioned above. Use of the surface layer (X) comprising such an intermediate layer (C) yields an electret-treated sheet having higher charge retaining properties than that in the case of using the surface layer (X) consisting only of the heat seal layer (B).

The intermediate layer (C) is preferably a stretched layer because the thickness uniformity of the surface layer (X) can be enhanced. High thickness uniformity of the surface layer (X) can decrease the local concentration of discharge onto a thin location under high voltage during the electret treatment, and can improve the uniformity of the electrical properties of the surface layer (X).

The intermediate layer (C) preferably contains an inorganic filler or an organic filler from the viewpoint of improving the electrical properties, such as a dielectric constant, of the surface layer (X). A material similar to that of the core layer (A) mentioned above can be used as the inorganic filler or the organic filler. Among them, the inorganic filler generally has a higher dielectric constant than that of the thermoplastic resin and is therefore suitable for improvement in the electrical properties of the surface layer (X). Particularly, in the case of using a resin, such as polyolefin resin, which has a low dielectric constant as the thermoplastic resin of the intermediate layer (C), the inorganic filler contained therein is preferred because charge can be allowed to rapidly reach the core layer (A) through the dielectric effect of the inorganic filler during the electret treatment.

The intermediate layer (C) preferably has a lower porosity than that of the core layer (A). The intermediate layer (C) having a lower porosity than that of the core layer (A) can be obtained by, for example, a method of decreasing the content of the filler, using a filler having a small average particle size, decreasing the number of stretching axes, or decreasing a stretch ratio, as compared with the core layer (A).

The intermediate layer (C) may have a single-layer structure or may have a multi-layer structure. The intermediate layer (C) having a multi-layer structure can change the types and contents of the thermoplastic resin and the inorganic filler or the organic filler in each layer, and permits design of an electret-treated sheet excellent in charge retention performance.

<Back Surface Layer (Y)>

The back surface layer (Y) is disposed on a side opposite to the side where the heat seal layer (B) is disposed on the core layer (A), as mentioned above. The back surface layer (Y) covers the other side of the core layer (A) and can thereby decrease charge transfer from this side of the core layer (A). Furthermore, the back surface layer (Y) facilitates injecting more charge under high voltage during the electret treatment.

The back surface layer (Y) may be a thermoplastic resin film similar to that of the core layer (A). The thermoplastic resin of the back surface layer (Y) is not particularly limited, and the same type of resin as in the core layer (A), specifically, polyolefin resin, is preferably used from the viewpoint of stretching properties.

The back surface layer (Y) can enhance thickness uniformity when being a stretched film. High thickness uniformity can decrease the local concentration of discharge onto a thin location under high voltage during the electret treatment, and can improve the uniformity of the electrical properties of the back surface layer (Y).

The back surface layer (Y) may or may not contain an inorganic filler or an organic filler, and preferably contains an inorganic filler or an organic filler from the viewpoint of improving the electrical properties, such as a dielectric constant, of the back surface layer (Y). A material similar to that of the core layer (A) mentioned above can be used as the inorganic filler or the organic filler. Among them, the inorganic filler generally has a higher dielectric constant than that of the thermoplastic resin and is therefore suitable for improvement in the electrical properties of the back surface layer (Y). Particularly, in the case of using a resin, such as polyolefin resin, which has a low dielectric constant as the thermoplastic resin of the back surface layer (Y), the inorganic filler contained therein is preferred because charge can be allowed to reach the core layer (A) through the dielectric effect of the inorganic filler during the electret treatment.

The back surface layer (Y) preferably has a lower porosity than that of the core layer (A). The back surface layer (Y) having a lower porosity than that of the core layer (A) can be obtained by, for example, a method of decreasing the content of the filler, using a filler having a small average particle size, decreasing the number of stretching axes, or decreasing a stretch ratio, as compared with the core layer (A).

The back surface layer (Y) may have a single-layer structure or may have a multi-layer structure. The back surface layer (Y) having a multi-layer structure can change the types and contents of the thermoplastic resin and the inorganic filler or the organic filler in each layer, and permits design of an electret-treated sheet excellent in charge retention performance.

(Production of Electret-Treated Sheet)

The electret-treated sheet is obtained by electret-treating a laminated sheet comprising the core layer (A), the surface layer (X) comprising the heat seal layer (B), and the back surface layer (Y) so that the surface or the inside of the laminated sheet is allowed to retain charge.

The laminated sheet having a multi-layer structure comprising the core layer (A), the surface layer (X) comprising the heat seal layer (B), and the back surface layer (Y) can be produced by, for example, a multi-layer die system using a feed block or a multi-layer die, an extrusion lamination system of laminating a melted heat seal layer (B) onto the core layer (A) or the intermediate layer (C), a coating system of coating the core layer (A) or the intermediate layer (C) with a solution or a water dispersion of the heat seal layer (B), followed by drying, or a dry lamination system of laminating a separately prepared heat seal layer (B) onto the core layer (A) or the intermediate layer (C) via an adhesive. Among them, a multi-layer die system or an extrusion lamination system is preferred by which a heat seal layer (B) having favorable chargeability is easily obtained. In the case of shaping each layer of the laminated sheet alone into a film, the film can be formed in the same way as in the core layer (A) mentioned above.

The laminated sheet preferably has a layer stretched at least in a uniaxial direction. The laminated sheet may be obtained, for example, by laminating the surface layer (X) and the back surface layer (Y) onto a core layer (A) stretched in the longitudinal direction. Alternatively, the surface layer (X) and the back surface layer (Y) may be laminated onto a core layer (A) stretched in the longitudinal direction, and then, the laminate can be further stretched in the lateral direction to prepare a laminated sheet having uniaxially/biaxially/uniaxially stretched layers. Preferred conditions such as a stretching method, a stretch ratio, and a stretching temperature are similar to those of the core layer (A) mentioned above.

<Electret Treatment>

The electret treatment of the laminated sheet may be performed before, after, or during a production process of a filter mentioned later. The configuration of an electret treatment apparatus is complicated for uniformly electret-treating a steric structure. Hence, it is preferred to electret-treat the laminated sheet in advance and configure a filter using the obtained electret-treated sheet, from the viewpoint of an electret treatment with an apparatus having a simple configuration.

The electret treatment method is not particularly limited and can be carried out according to a method known in the art. Examples thereof include an electroelectret treatment method of causing corona discharge or applying pulsed high voltage to the surface of the laminated sheet, a method of holding both sides of the laminated sheet with dielectric materials, and applying direct-current high voltage to both the sides, and a radioelectret treatment method of irradiating the laminated sheet with ionizing radiation such as γ ray or electron beam.

<<Electroelectret Treatment Method>>

The electroelectret treatment method is preferably, for example, a batch system of fixing the laminated sheet to between an application electrode and an earth electrode connected to a direct-current high voltage power source, or a transportation system of allowing the laminated sheet to pass therethrough. For the electroelectret treatment method, it is preferred to arrange an infinite number of needle-like electrodes equally spaced, or to use a metal wire and use a flat metal plate or a metal roll in the earth electrode.

The electret treatment more preferably employs a direct-current corona discharge treatment.

Figure 3:
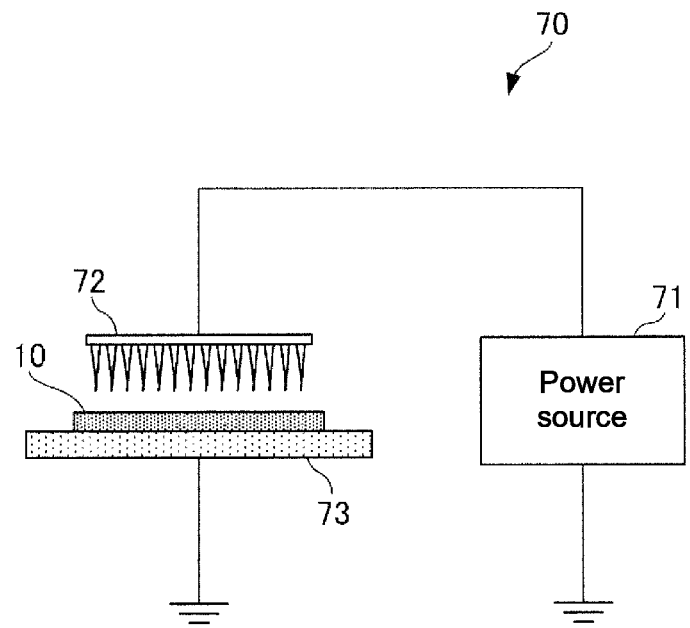
FIG. 3 is a diagram showing one example of an electret treatment apparatus.

FIG. 3 shows one example of an electret treatment apparatus of a batch system for use in the direct-current corona discharge treatment. As shown in FIG. 3, electret treatment apparatus 70 has needle-like main electrode (application electrode) 72 and flat plate-like counter electrode (earth electrode) 73 connected to direct-current high voltage power source 71. In the electret treatment apparatus 70, film 10 to be electret-treated (e.g., the laminated sheet mentioned above) is placed between the main electrode 72 and the counter electrode 73. The direct-current high voltage power source 71 can apply direct-current high voltage to between the main electrode 72 and the counter electrode 73 to cause corona discharge, thereby injecting charge to the film 10.

A longer interval between the main electrode and the counter electrode more easily maintains a uniform interelectrode distance. Therefore, the interval is preferably 1 μmm or longer, more preferably 2 μmm or longer, further preferably 5 μmm or longer. On the other hand, a shorter interval between the main electrode and the counter electrode more easily causes corona discharge and more easily improves the chargeability uniformity of the core layer (A). Therefore, the interval is preferably 50 mm or shorter, more preferably 30 μmm or shorter, further preferably 20 μmm or shorter. Hence, the interval between the main electrode and the counter electrode is preferably 1 to 50 μmm, more preferably 2 to 30 μmm, further preferably 5 to 20 μmm.

The voltage to be applied to between the main electrode and the counter electrode is determined depending on the electrical properties, such as insulating properties, of the core layer (A), surface potential required for the electret-treated sheet, electrical properties such as a relative dielectric constant, the shapes or materials of the main electrode and the counter electrode, the interval between the main electrode and the counter electrode, etc.

The amount of the charge introduced to the core layer (A) by the direct-current corona discharge treatment depends on the amount of current flowing in the main electrode and the counter electrode during the treatment. The amount of current is larger at higher voltage between both the electrodes. Hence, the applied voltage is preferably set to be high to an extent that the core layer (A) does not electrically break down, if a higher treatment effect is desired. On the other hand, the applied voltage is, specifically, preferably 1 to 100 kV, more preferably 3 to 70 kV, further preferably 5 to 50 kV, particularly preferably 10 to 30 kV, on the assumption of a general direct-current corona discharge treatment.

The polarity on the main electrode side may be positive or negative. Negative polarity on the main electrode side is preferred because a relatively stable corona discharge treatment can be performed.

The material of the main electrode or the counter electrode is appropriately selected from conductive substances, and a material made of a metal such as iron, stainless, copper, brass or tungsten, or made of carbon is usually used.

The laminated sheet may be subjected to a static elimination treatment after the electret treatment. The static elimination treatment temporarily decreases or removes surface charge. This facilitates circumventing adsorption of dust and dirt, sticking between sheets, sticking of the sheet to production equipment, etc. in a production process including the processing of the electret-treated sheet into a filter. The static elimination treatment can employ a known static elimination apparatus such as a voltage application-type static eliminator (ionizer) or a self-discharge-type static eliminator. These general static elimination apparatuses can decrease or remove sheet surface charge, but cannot remove charge stored in the inside of the sheet. Therefore, the electrostatic adsorption force of the electret-treated sheet is not largely influenced by the static elimination treatment.

(Physical Properties of Electret-Treated Sheet)
<Thickness>

The thickness of the core layer (A) is preferably 10 µm or larger, more preferably 20 µm or larger, further preferably 30 µm or larger. A thicker core layer (A) can store more sufficient charge. Therefore, an electret-treated sheet excellent in water resistance is easily obtained. On the other hand, the thickness of the core layer (A) is preferably 300 µm or smaller, more preferably 200 µm, more preferably 100 µm or smaller. A thinner core layer (A) renders pores less likely to collapse during bending processing into a corrugated plate-like form, such as corrugation processing, and facilitates fine-pitch corrugation processing. Therefore, a filter having a high dust collecting effect is easily obtained.

The thicknesses of the surface layer (X) and the back surface layer (Y) are each independently 5 m or larger, preferably 7 µm or larger, more preferably 10 µm or larger, further preferably 15 µmm or larger. The thickness of the surface layer (X) and the thickness of the back surface layer (Y) may be the same or different. A thicker surface layer (X) and back surface layer (Y) more easily suppress the transfer of charge stored in the core layer (A) upon washing. Thus, an electret-treated sheet excellent in water resistance is easily obtained. On the other hand, the thicknesses of the surface layer (X) and the back surface layer (Y) are each independently 200 µm or smaller, preferably 100 µm or smaller, more preferably 80 µm or smaller, further preferably 70 µm or smaller, particularly preferably 30 µm or smaller. A thinner surface layer (X) more easily induces charge stored in the core layer (A) to the electret-treated sheet surface after washing. Thus, excellent water resistance is easily obtained. Thus, the thickness of the surface layer (X) is 5 to 200 µm, preferably 5 to 100 µm, more preferably 7 to 80 µm, further preferably 10 to 70 µm, particularly preferably 15 to 30 µm.

When the surface layer (X) consists of the heat seal layer (B), the thickness of the heat seal layer (B) corresponds to the thickness of the surface layer (X) mentioned above.

On the other hand, when the intermediate layer (C) is disposed between the core layer (A) and the heat seal layer (B), the total thickness of the heat seal layer (B) and the intermediate layer (C) corresponds to the thickness of the surface layer (X). In this case, the thickness of the heat seal layer (B) is preferably 1 µm or larger, more preferably 2 µm or larger, further preferably 3 µm or larger. The thickness of the heat seal layer (B) equal to or larger than the lower limit value is preferred because stable adhesive strength is exerted. On the other hand, the thickness of the heat seal layer (B) is preferably 50 µm or smaller, more preferably 20 µm or smaller, further preferably 10 µm or smaller, particularly preferably 7 µm or smaller, from the viewpoint of charge retention.

The thickness of the intermediate layer (C) can be appropriately adjusted such that the total thickness of the heat seal layer (B) and the intermediate layer (C) falls within the thickness range of the surface layer mentioned above when the intermediate layer (C) is combined with the heat seal layer (B).

The thickness of the electret-treated sheet of the present invention is preferably 20 µm or larger, more preferably 30 µm or larger, further preferably 40 µm or larger. A thicker electret-treated sheet more easily maintains its shape when subjected to corrugation processing. Thus, an electret-treated sheet excellent in processability is easily obtained. On the other hand, the thickness of the electret-treated sheet is preferably 400 µm or smaller, more preferably 300 µm or smaller, further preferably 200 µm or smaller. A thinner electret-treated sheet has higher bending processability by corrugation processing or the like. Thus, a filter having a stable shape is easily obtained.

The thickness of the electret-treated sheet is measured using a thickness gauge in accordance with JIS-K7130: 1999.

The thickness of each layer constituting the electret-treated sheet can be measured as follows: a sample to be measured is cooled to a temperature of −60° C. or lower with liquid nitrogen. The sample placed on a glass plate is cut at a right angle with a razor blade (manufactured by Schick Japan K.K., trade name: Proline Blade) to prepare a sample for cross-sectional observation. An image of the cross-section of the obtained sample is observed under a scanning electron microscope (manufactured by JEOL Ltd., trade name: JSM-6490), and a boundary line of each layer is determined from a pore shape and composition and appearance. The ratio of the thickness of each layer to the total thickness of the electret-treated sheet is calculated from the boundary line of each layer. The thickness of each layer is determined from the total thickness of the electret-treated sheet measured with a thickness gauge, the magnification ratio of the image of the cross-section and the thickness ratio of each layer.

<Porosity>

The core layer (A) and the electret-treated sheet having the core layer (A) have fine pores in the inside. The porosity, which represents the percentage of pores in the core layer (A), is preferably 1% or more, more preferably 5% or more, further preferably 25% or more. A larger porosity slows down a charge decay rate and more easily improves the sustention of filter performance. On the other hand, the porosity of the core layer (A) is preferably 70% or less, more preferably 60% or less, further preferably 55% or less. A smaller porosity tends to decrease the number of pores communicating with each other and to improve the ability to retain charge. Thus, the porosity of the core layer (A) is preferably 1 to 70%, more preferably 5 to 60%, further preferably 25 to 55%. Adsorption force for dirt, etc. is easily stabilized by controlling the porosity within the range described above.

The porosity (%) can be measured under an electron microscope. Specifically, an arbitrary portion of a sheet to be measured is cut out, embedded in epoxy resin, solidified, and then cut vertically in the planar direction of the sheet using a microtome to prepare a sample for cross-sectional observation. The sample is attached to an observation sample table such that the cut surface of the sample serves as an observation surface. Gold, gold-palladium, or the like is vapor-deposited on the observation surface. Pores are observed at an arbitrary magnification (e.g., a magnification ratio of ×500 to ×3000) that permits easy observation under an electron microscope. The observed region is captured as an image data. The obtained image data is subjected to image processing with an image analysis apparatus. The area ratio (%) of the pore moiety can be calculated to obtain this area ratio (%) as the porosity (%). In this case, measurement values from the observation of arbitrary 10 or more locations are averaged, and the average value can be regarded as the porosity.

The electret-treated sheet having pores in the inside easily traps charge in the inside of the electret-treated sheet so that the charge is less likely to escape. Hence, a filter having both of a high dust collecting effect and excellent sustention of the dust collecting effect is easily obtained. Also, the electret-treated sheet having pores in the inside is preferred from the viewpoint of the weight reduction of a filter because the density of the electret-treated sheet is decreased.

<The Number of Pore Interfaces>

The number of pore interfaces of the core layer (A) and the electret-treated sheet is preferably 50 interfaces/mm or more, more preferably 70 interfaces/mm or more, further preferably 100 interfaces/mm or more. The core layer (A) having a larger number of pore interfaces more easily retains sufficient charge. Thus, an electret-treated sheet excellent in water resistance tends to be obtained. On the other hand, the number of pore interfaces of the core layer (A) is preferably 1000 interfaces/mm or less, more preferably 800 interfaces/mm or less, further preferably 600 interfaces/mm or less, particularly preferably 500 interfaces/mm or less. A smaller number of pore interfaces can more sufficiently secure a pore height (pore diameter in the thickness direction of the core layer (A)). Thus, the pores tend to easily retain charge in the inside. Thus, the number of pore interfaces of the core layer (A) and the electret-treated sheet is preferably 50 to 1000 interfaces/mm, more preferably 70 to 800 interfaces/mm, further preferably 100 to 800 interfaces/mm, particularly preferably 100 to 600 interfaces/mm, most preferably 100 to 500 interfaces/mm.

The number of pore interfaces of the core layer (A) can be determined as follows: the sample for cross-sectional observation prepared for the thickness measurement described above is photographed at a magnification of ×500 under a scanning electron microscope (manufactured by JEOL Ltd., trade name: JSM-6490). Images of the cross-section thus taken are stuck such that an observation length is 1 μmm in width. Vertical lines are stretched at arbitrary 5 points in the obtained image of the cross-section. The number of pore interfaces in the core layer (A) moiety intersecting each vertical line is counted, and an average value from the 5 points is determined and divided by the thickness of the core layer (A) to determine the number of pore interfaces. An average value from the transverse direction (TD) and the machine direction (MD) of the film is used in frequency measurement for the number of pore interfaces.

<Average Pore Height>

An average diameter of pores in the thickness direction of the core layer (A) (hereinafter, also simply referred to as an "average pore height") is preferably 2.5 μm or larger, more preferably 3.0 μm or larger, further preferably 4.0 μm or larger. Pores having a larger average pore height tend to easily store charge in the inside. Thus, an electret-treated sheet excellent in water resistance is easily obtained. On the other hand, the average pore height of the core layer (A) is preferably 15 μm or smaller, more preferably 12 μm or smaller, further preferably 10 μm or smaller. Pores having a smaller average pore height tend to easily store charge in the inside. Thus, the electret-treated sheet tends to be excellent in water resistance. Thus, the average pore height is preferably 2.5 to 15 μm, more preferably 3.0 to 12 μm, further preferably 4.0 to 10 μm.

The average pore height of the core layer (A) can be determined as follows: pores at arbitrary 20 points are selected in the image of the cross-section prepared for the measurement of the number of pore interfaces described above. A diameter at a location where the size of each pore is largest is measured in the thickness direction of the core layer (A). An average value of the diameters of the pores at the selected 20 points is determined as the average pore height from the measurement values and the magnification for taking the image of the cross-section. An average value from the transverse direction (TD) and the machine direction (MD) of the resin film is used as the average pore height.

<Aspect Ratio>

The pore aspect ratio of the core layer (A) is preferably 5 or more, more preferably 10 or more, further preferably 15 or more. Pores having a larger pore aspect ratio in the core layer (A) tend to easily maintain charge in the inside. Thus, an electret-treated sheet excellent in water resistance is easily obtained. On the other hand, the pore aspect ratio of the core layer (A) is preferably 50 or less, more preferably 45 or less, further preferably 40 or less. A smaller pore aspect ratio more easily circumvents the disappearance of charge ascribable to the inflow of air or water from end faces due to pores communicating with each other.

The pore aspect ratio of the core layer (A) can be determined as follows: the largest diameter in the transverse direction (i.e., a direction perpendicular to the thickness direction of the core layer (A) in the image of the cross-section prepared for the measurement of the number of pore interfaces) (hereinafter, also simply referred to as a "pore width") is measured as to each pore after the average height measurement. The measured pore width is divided by the pore height. The values of 20 pores thus determined are averaged, and the obtained average value is used as the aspect ratio. The average pore height is measured in each of the transverse direction (TD) and the machine direction (MD) of the resin film. The aspect ratios both in the transverse direction (TD) and in the machine direction (MD) preferably fall within the range mentioned above.

<Water Vapor Permeability Coefficient>

The water vapor permeability coefficient of the electret-treated sheet is used to determine the presence or absence of communicating pores. A larger water vapor permeability coefficient more easily causes discharge due to communicating pore surfaces or intervening water vapor.

The water vapor permeability coefficient of the electret-treated sheet of the present invention is preferably 2.5 g·mm/m$^2$·24 hr or less, more preferably 2.0 g·mm/m$^2$·24 hr or less, further preferably 1.8 g·mm/m$^2$·24 hr or less. When the water vapor permeability coefficient is 2.5 g·mm/m$^2$·24 hr or less, reduction in chargeability under high humidity is easily suppressed and the intended performance of the present invention is easily exerted. On the other hand, the thermoplastic resin, for example, polyolefin resin, contained in each layer constituting the electret-treated sheet has a water vapor permeability coefficient around 0.1 g/m$^2$·24 hr. Therefore, the water vapor permeability coefficient of the electret-treated sheet is usually 0.1 g/m$^2$·24 hr or more, and may be 0.2 g·mm/m$^2$·24 hr or more or may be 0.3 g·mm/m$^2$·24 hr or more. Thus, the water vapor permeability coefficient is preferably 0.1 to 2.5 g·mm/m$^2$·24 hr, more preferably 0.2 to 2.0 g·mm/m$^2$·24 hr, further preferably 0.3 to 1.8 g·mm/m$^2$·24 hr.

The water vapor permeability coefficient (g·mm/m$^2$·24 hr) is a value determined by measuring a water vapor transmission rate (g/(m$^2$·24 hr)) under conditions involving a temperature of 40° C. and a relative humidity of 90% by the dish method in accordance with JIS-Z-0208: 1976, and converting the measurement value into the water vapor permeability coefficient from the thickness (mm) of the sheet. The surface layer (X) and the back surface layer (Y) of the electret-treated sheet of the present invention have an insulating effect that does not allow charge stored in the core layer (A) to escape to the outside. If the effect is low, the water vapor permeability coefficient is high, resulting in poor ability to retain charge. If most of the pores in the electret-treated sheet of the present invention communicate with each other, the water vapor permeability coefficient is similarly high, resulting in poor ability to retain charge.

<Relative Dielectric Constant>

The electret-treated sheet is a member constituting a filter, and also has a role in sealing off charge so as not to escape to the outside of the filter. This ability to seal off charge can be represented by relative dielectric constant s of the electret-treated sheet (the ratio of dielectric constant $\varepsilon B$ to vacuum dielectric constant $\varepsilon 0$ of the electret-treated sheet, $\varepsilon B/\varepsilon 0$).

Usually, the electret-treated sheet having a lower relative dielectric constant tends to have higher surface potential even if the amount of charge is the same. Thus, a filter excellent in dust collecting effect on dust and dirt is easily obtained. The relative dielectric constant of the electret-treated sheet can be adjusted to the desired lower range by involving an insulating resin having a low dielectric constant, or by forming pores in the inside of the electret-treated sheet.

The relative dielectric constant of the electret-treated sheet of the present invention is preferably 1.1 or more, more preferably 1.2 or more, further preferably 1.25 or more. A larger relative dielectric constant facilitates obtaining a filter less likely to reduce the ability to retain charge with the electret-treated sheet having a porosity of 70% or less. On the other hand, the relative dielectric constant of the electret-treated sheet is preferably 2.5 or less, more preferably 2.2 or less, further preferably 2.0 or less, particularly preferably 1.9 or less. The electret-treated sheet having a smaller relative dielectric constant more easily retains charge for a long period and tends to be less likely to reduce the electrostatic adsorption force of a filter. Thus, the relative dielectric constant of the electret-treated sheet is preferably 1.1 to 2.5, more preferably 1.1 to 2.2, further preferably 1.2 to 2.0, particularly preferably 1.25 to 1.9.

The method for measuring the relative dielectric constant of the electret-treated sheet is selected depending on a measurement frequency range. When the measurement frequency is 10 Hz or lower, an ultralow-frequency bridge is used. When the measurement frequency is 10 Hz to 3 MHz, a transformer bridge is used. When the measurement frequency exceeds 1 MHz, a parallel T-shaped bridge, a high-frequency Schering bridge, a Q meter, a resonance method, a standing-wave method, a cavity resonance method, or the like is used. Alternatively, the relative dielectric constant may be measured with, for example, an LCR meter which measures a voltage-current vector for a circuit component as to an alternating-current signal of the measurement frequency, and calculates a capacitance from this value.

The measurement apparatus for the relative dielectric constant of the electret-treated sheet is preferably a measurement apparatus that can apply voltage on the order of 5 V and can arbitrarily select the measurement frequency. According to such a measurement apparatus, the frequency dependence of a sample can be grasped by changing the frequency, and can be used as an index for a proper range of use. Examples of such a measurement apparatus include "4192A LF IMPEDANCE ANALYZER" from Agilent Technologies, Inc., "LCR Meter 4274A" from Yokogawa Electric Corp., and "HIOKI 3522 LCR Hitester" from Hioki E.E. Corp.

When the relative dielectric constant of the electret-treated sheet is measured, both sides of the sheet are first coated with a conductive silver coating material, or vacuum metal vapor deposition is performed on both sides of the sheet so that electrodes are formed to obtain a sample. Subsequently, voltage of 5 V is applied to the sample under ambient conditions involving a temperature of 23° C. and a relative humidity of 50%. A capacitance (Cx) is measured at a frequency of 10 Hz to 1 MHz to obtain a measurement value of the capacitance (Cx) at a frequency of 100 kHz as a representative value. A relative dielectric constant ($\varepsilon r$) is calculated from the obtained capacitance (Cx) according to the following expression.

$$\varepsilon r = Cx \times h / (\varepsilon 0 \times A)$$

$\varepsilon r$: the relative dielectric constant (–) of the electret-treated sheet
Cx: the capacitance (pF) of the electret-treated sheet
h: the thickness (m) of the electret-treated sheet
$\varepsilon 0$: vacuum dielectric constant=8.854 (pF/m)
A: area of the main electrode=$3.848 \times 10^{-4}$ (m$^2$)

<Center-Line Average Roughness of Surface>

The electret-treated sheet preferably has a smooth surface from the viewpoint of processability for filter production. Therefore, the center-line average roughness (SRa) of the surface of the electret-treated sheet is preferably 5 μm or smaller, more preferably 4 μm or smaller. On the other hand, the electret-treated sheet preferably has a surface asperity from the viewpoint of retaining foreign matter adsorbed by a filter. Hence, the center-line average roughness (SRa) of the surface of the electret-treated sheet is preferably 0.1 μm or larger, more preferably 0.3 μm or larger. Thus, the center-line average roughness (SRa) of the surface of the electret-treated sheet is preferably 0.1 to 5 μm, more preferably 0.3 to 4 μm.

The center-line average roughness (SRa) of the surface of the electret-treated sheet can be measured using a stylus-type three-dimensional surface roughness meter. Specific examples of the measurement apparatus include "SURFCOM series (5000DX, 2000DX3/SX3, 1500DX3/SD3, 1900DX3/SX, and 2900DX3/SX)" (trade name) manufactured by Tokyo Seimitsu Co., Ltd., and "SURFCORDER series (SE3500K and SE4000)" (trade name) manufactured by Kosaka Laboratory Ltd. The measurement of the center-line average roughness (SRa) preferably employs an apparatus having measurement accuracy of 0.01 μm or less.

<Surface Resistivity>

For obtaining the electret-treated sheet by electret-treating the laminated sheet having the surface layer (X), the core layer (A) and the back surface layer (Y), the surface resistivity of the surface layer (X) and the back surface layer (Y) is preferably $1 \times 10^{13}$ to $9 \times 10^{17} \Omega$. The surface resistivity is more preferably $5 \times 10^{13}$ to $9 \times 10^{16} \Omega$, further preferably $1 \times 10^{14}$ to $9 \times 10^{15} \Omega$. When the surface resistivity is $1 \times 10^{13} \Omega$ or higher, charge applied by the electret treatment is less likely to move along the film surface. Thus, reduction in the efficiency of charge injection into the laminated sheet is easily suppressed. As a result, decrease in the charge density of the electret-treated sheet surface, decrease in space charge density and reduction in electrostatic adsorption performance are also easily suppressed. Furthermore, energy necessary for the electret treatment can also be decreased. On the other hand, when the surface resistivity is $9 \times 10^{17} \Omega$ or lower, such a highly insulating surface is easily formed using a known material and cost is also easily reduced.

The surface resistivity of the surface layer (X) and the back surface layer (Y) can be adjusted to within the range of interest by using polyolefin resin excellent in insulating properties as the thermoplastic resin, and adjusting the type or amount of the inorganic filler to be blended with the thermoplastic resin, for example.

(Filter)

The filter of the present invention comprises an air flow path formed by alternately laminating a corrugated plate-like electret-treated sheet and a flat plate-like electret-treated sheet, and has a joint at which the laminated electret-treated sheets are thermally fused to each other. Each electret-treated sheet for use in the filter of the present invention is the electret-treated sheet of the present invention mentioned above. Therefore, a filter having little reduction in chargeability after washing and little separation between sheets is obtained.

Figure 4:
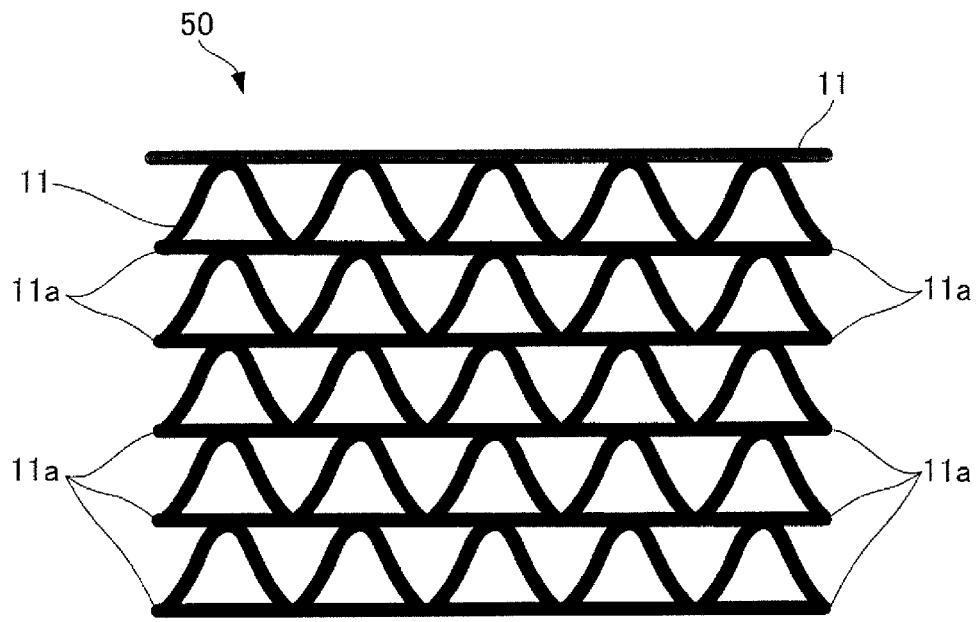
FIG. 4 is a side view showing the steric structure of a filter according to one embodiment of the present invention.

FIG. 4 shows the configuration of a filter according to one embodiment of the present invention.

As shown in FIG. 4, filter 50 of the present embodiment is prepared by alternately repetitively laminating corrugated plate-like electret-treated sheets 11 and flat plate-like electret-treated sheets 11. The filter 50 is provided with space serving as an air flow path by the respective steric structures of the corrugated plate-like and flat plate-like electret-treated sheets 11. The filter 50 has joints 11a at which the electret-treated sheets are thermally fused to each other at their contact portions.

(Method for Producing Filter)

The steric structure of the filter comprising an air flow path can be formed by corrugation processing or the like. After the formation of the steric structure, the heat seal layers (B) at a portion where the laminated electret-treated sheets are in contact can be thermally fused to each other so that the sheets are joined together while the steric structure of the filter is fixed. The joining method is not particularly limited. For example, the electret-treated sheets are laminated during corrugation processing, and the sheet surfaces can be heated with a heated pressure roll so that the contact portions of the adjacent electret-treated sheets are thermally fused to each other to establish a joint. Alternatively, the laminated electret-treated sheets are cut with a hot wire cutter or the like, and the cut portions can be thermally fused to each other.

<Corrugation Processing>

In the case of producing the filter by the corrugation processing of the electret-treated sheets, a corrugation machine such as a honeycomb machine for use in usual paper honeycomb core production or a single facer for use in usual paper cardboard production can be appropriately utilized in the production.

In the case of using a single facer for use in paper cardboard production, the electret-treated sheet is supplied to between a pair of engaged gears and corrugation-processed into a corrugated plate-like form by inflection. Subsequently, a flat plate-like sheet (hereinafter, also referred to as a "liner") without corrugation processing is thermally fused to one side or both sides of the corrugated plate-like sheet (hereinafter, also referred to as a "flute") obtained by the corrugation processing to obtain a corrugated core. In this respect, another resin sheet or the like obtained by melt extrusion from a T-die may be used as the liner. The electret-treated sheet mentioned above is more preferably used, as in the flute, from the viewpoint of improving the space charge density of the filter.

(Properties of Filter)

<Space Charge Density>

The space charge density of the filter refers to the total amount of charge occupying the space capacity of the filter. A higher value of the space charge density means higher collection performance for dust and dirt. Specifically, the space charge density of the filter is obtained by dividing the amount of charge carried by a sheet base material of the filter by the space capacity formed by the sheet base material. An actually measured value is used as the amount of charge carried by a sheet base material of the filter, and the space capacity may be logically determined from the shape of the filter or may be determined from the density of the filter.

For example, in the case of logically determining the space capacity from the shape of the filter, unit space thereof is defined as a 1 cm long×1 cm wide×1 cm high cube. Total length Ls (cm/cm²) of the electret-treated sheets present per 1 cm long×1 cm wide square (unit area) at a cross-section cut vertically to the flow path of the electret filter is determined by calculation or measurement from the filter shape.

Total area Ss (cm²/cm³) of the electret-treated sheets present per unit space capacity is a value obtained by multiplying the total length Ls of the electret-treated sheets present per cross-sectional square (unit area) by the depth of the unit space as the width of the sheet. Therefore, Ss and Ls are the same values, as represented by the following expression.

$Ss$ (cm²/cm³)=$Ls$ (cm/cm²)×1 cm/1 cm=$Ls$ (cm/cm²)

On the other hand, amount Qs of charge (nC/cm²) per unit area of the electret-treated sheet is determined by actual measurement. Thus, amount Qa of charge (nC/cm³) of the electret-treated sheets present per unit space, i.e., the space charge density, is represented by the following expression.

$Qa$ (nC/cm³)=$Ss$ (cm²/cm³)×$Qs$ (nC/cm²)=$Ls$ (cm/cm²)×$Qs$ (nC/cm²)

As described above, the space charge density can be determined from the product of the total length Ls of the electret-treated sheets present per unit area at the cross-section and the amount Qs of charge per unit area of the electret-treated sheet. When the filter is constituted by many types of electret-treated sheets, for example, constituted by 1, 2, . . . n types of electret-treated sheets, the amount Qa of charge of the electret-treated sheets present per unit space is represented by the sum of respective amounts Qa1, Qa2, . . . Qan of charge per unit space of the electret-treated sheets.

The filter having a higher space charge density has higher collection efficiency, and can shorten the length of the air flow path (depth or thickness of the filter) when the collection efficiency required for the filter is constant. On the other hand, the lifetime of the filter can be prolonged when the length of the air flow path is constant.

The lower limit of the space charge density is 10 nC/cm³ or larger, preferably 50 nC/cm³ or larger, more preferably 80 nC/cm³ or larger, particularly preferably 110 nC/cm³ or larger, from the viewpoint of enhancing collection efficiency. On the other hand, the upper limit thereof is 5000 nC/cm³ or smaller because of the limited amount of charge that can be carried by the sheet base material, and is preferably 2000 nC/cm³ or smaller, more preferably 1000 nC/cm³ or smaller, because of convenient sheet base material production.

<Cross-Sectional Ratio of Flow Path>

The cross-sectional ratio of the air flow path of the filter refers to the ratio of the air flow path to the cross-section of the filter. Thus, a lower value of the cross-sectional ratio of the flow path tends to mean that the strength of the filter is increased while resistance to air circulation occurs to increase pressure drop.

Specifically, the cross-sectional ratio of the air flow path is obtained by dividing the cross-sectional area of the sheet base material which is the product of the thickness of the sheet base material and the length of the sheet base material used in flow path formation from the cross-sectional area of the filter. Alternatively, the cross-sectional ratio of the flow path may be determined by cross-sectional image observation.

The cross-sectional ratio of the air flow path of the filter is preferably 10% or more, more preferably 30% or more, further preferably 50% or more, from the viewpoint of decreasing pressure drop against air circulation. On the other hand, the cross-sectional ratio of the air flow path of the filter is preferably 99% or less, more preferably 97% or less, further preferably 95% or less, from the viewpoint of the strength of the filter.

EXAMPLES

Hereinafter, the present invention will be described further specifically with reference to Production Examples, Preparation Examples, Examples, Comparative Examples and Test Examples. Materials, amounts used, ratios, operations, etc. given below can be appropriately changed without departing from the spirit of the present invention. Thus, the scope of the present invention is not limited by the specific examples given below. In the description below, the term "%" refers to % by mass unless otherwise specified.

The following raw materials were used in each of Examples and Comparative Examples.
(Raw Material)
<Pore-Forming Nucleating Agent>
Heavy calcium carbonate (manufactured by Bihoku Funka Kogyo Co., Ltd., trade name: BF100, median size ($D_{50}$): 10.1 μm, density: 2.7 g/cm$^3$)
Heavy calcium carbonate (manufactured by Bihoku Funka Kogyo Co., Ltd., trade name: SOFTON 1800, median size ($D_{50}$): 2.2 μm, density: 2.7 g/cm$^3$)
<Thermoplastic Resin>
Propylene homopolymer (manufactured by Japan Polypropylene Corp., trade name: NOVATEC PP FY4, MFR (230° C., 2.16 kg load): 5 g/10 μmin, melting point: 162° C., density: 0.91 g/cm$^3$)
Propylene-α-olefin random copolymer (manufactured by Japan Polypropylene Corp., trade name: NOVATEC PP FX4G, MFR (230° C., 2.16 kg load): 5.0 g/10 μmin, melting point: 127° C., density: 0.90 g/cm$^3$)
Polypropylene elastomer (manufactured by Mitsui Chemicals, Inc., trade name: TAFMER XM-7070, MFR (230° C., 2.16 kg load): 7.0 g/10 μmin, melting point: 75° C., density: 0.90 g/cm$^3$)
Propylene-ethylene random copolymer (manufactured by Japan Polypropylene Corp., trade name: NOVATEC PP FW4B, MFR (230° C., 2.16 kg load): 7.0 g/10 μmin, melting point: 140° C., density: 0.90 g/cm$^3$)
High-density polyethylene (manufactured by Japan Polyethylene Corp., trade name: NOVATEC HD HJ360, MFR (190° C., 2.16 kg load): 5.5 g/10 μmin, melting point: 131° C., density: 0.95 g/cm$^3$)
Low-density polyethylene (manufactured by Japan Polyethylene Corp., trade name: KERNEL KS340T), MFR (190° C., 2.16 kg load): 3.5 g/10 μmin, melting point: 60° C., density: 0.880 g/cm$^3$)
<Additive>
Dihydroxyaluminum octadecanoate (manufactured by Wako Pure Chemical Industries, Ltd., reagent, melting point: 172° C.)
Ethylenebis(oleamide) (manufactured by Wako Pure Chemical Industries, Ltd., reagent, melting point: 115° C.)
(Production Examples of Resin Composition)
<Resin Compositions (a) to (d), (f) and (g)>
A propylene homopolymer, high-density polyethylene, heavy calcium carbonate and an additive were blended as shown in Table 1 and melt-kneaded in a biaxial kneader set to 210° C. Subsequently, the kneaded product was extruded into strands in an extruder set to 230° C. The extrudate was cooled and then cut with a strand cutter to prepare pellets, which were used in the subsequent production.
<Resin Composition (e)>
Low-density polyethylene and an additive described in Table 1 were melt-kneaded in a biaxial kneader set to 120° C. Subsequently, the kneaded product was extruded into strands in an extruder set to 120° C. The extrudate was cooled and then cut with a strand cutter to prepare pellets of a resin composition (e), which were used in the subsequent production.
<Resin Compositions (i) to (n)>
Polypropylene resin, high-density polyethylene, heavy calcium carbonate and an additive were blended as shown in Table 1 and melt-kneaded in a biaxial kneader set to 200° C. Subsequently, the kneaded product was extruded into strands in an extruder set to 200° C. The extrudate was cooled and then cut with a strand cutter to prepare pellets, which were used in the subsequent production.

Table 1 shows the composition of the resin compositions (a) to (n). A propylene homopolymer described in Table 1 was used alone as it is as the resin composition (h).

TABLE 1

| | | Resin composition amount blended [% by mass] | | | | | | | | | | | | |
| --- | --- | --- | --- | --- | --- | --- | --- | --- | --- | --- | --- | --- | --- | --- |
| | | Core layer (A) | | | | | | Intermediate layer (C) Back surface layer (Y) | | | Heat seal layer (B) | | | |
| | Material name | a | f | g | m | n | c | h | b | d | e | i | j | k | l |
| Pore-forming nucleating agents | Heavy calcium carbonate (manufactured by Bihoku Funka Kogyo Co., Ltd., trade name: BF100, median size D50: 10.1 μm, density: 2.7 g/cm$^3$) | 18 | 18 | 18 | 18 | 18 | 0 | 0 | 6 | 0 | 0 | 0 | 0 | 0 | 0 |
| | Heavy calcium carbonate (manufactured by Bihoku Funka Kogyo Co., Ltd., trade name: SOFTON 1800, median size D50: 2.2 μm, density: 2.7 g/cm$^3$) | 0 | 0 | 0 | 0 | 0 | 18 | 0 | 0 | 45 | 0 | 0 | 0 | 0 | 0 |

TABLE 1-continued

| | | Core layer (A) | | | | | | Intermediate layer (C) Back surface layer (Y) | | | Heat seal layer (B) | | | | |
|---|---|---|---|---|---|---|---|---|---|---|---|---|---|---|---|
| | Material name | a | f | g | m | n | c | h | b | d | e | i | j | k | l |
| Thermo- plastic resins | Propylene homopolymer (manufactured by Japan Polypropylene Corp., trade name: NOVATEC PP FY4, MFR (230° C., 2.16 kg load): 5 g/10 min, melting point: 162° C., density: 0.91 g/cm³) | 71.8 | 67.0 | 71.5 | 71.7 | 71.0 | 72 | 100.0 | 89 | 50 | 0 | 0 | 0 | 0 | 0 |
| | Propylene-α-olefin random copolymer (manufactured by Japan Polypropylene Corp., trade name: NOVATEC PP FX4G, MFR (230° C., 2.16 kg load): 5.0 g/10 min, melting point: 127° C., density: 0.90 g/cm³) | 0 | 0 | 0 | 0 | 0 | 0 | 0 | 0 | 0 | 0 | 0 | 0 | 0 | 99.7 |
| | Polypropylene elastomer (manufactured by Mitsui Chemicals, Inc., trade name: TAFMER XM-7070, MFR (230° C., 2.16 kg load): 7.0 g/10 min, melting point: 75° C., density: 0.90 g/cm³) | 0 | 0 | 0 | 0 | 0 | 0 | 0 | 0 | 0 | 0 | 0 | 20 | 50 | 0 |
| | Propylene-ethylene random copolymer (manufactured by Japan Polypropylene Corp., trade name: NOVATEC PP FW4B, MFR (230° C., 2.16 kg load): 7.0 g/10 min, melting point: 140° C., density: 0.90 g/cm³) | 0 | 0 | 0 | 0 | 0 | 0 | 0 | 0 | 0 | 0 | 99.7 | 79.7 | 49.7 | 0 |
| | High-density polyethylene (manufactured by Japan Polyethylene Corp., trade name: NOVATEC HD HJ360, MFR (190° C., 2.16 kg load): 5.5 g/10 min, melting point: 131° C., density: 0.95 g/cm³) | 10 | 10 | 10 | 10 | 10 | 10 | 0 | 5 | 5 | 0 | 0 | 0 | 0 | 0 |
| | Low-density polyethylene (manufactured by Japan Polyethylene Corp., trade name: KERNEL KS340T), MFR (190° C., 2.16 kg load): 3.5 g/10 min, melting point: 60° C., density: 0.880 g/cm³) | 0 | 0 | 0 | 0 | 0 | 0 | 0 | 0 | 0 | 99.7 | 0 | 0 | 0 | 0 |
| Additives | Dihydroxyaluminum octadecanoate (manufactured by Wako Pure Chemical Industries, Ltd., reagent, melting point: 172° C.) | 0.2 | 5 | 0.5 | 0.3 | 1.0 | 0.05 | 0 | 0.2 | 0.05 | 0 | 0 | 0 | 0 | 0 |
| | Ethylenebis(oleamide) (manufactured by Wako Pure Chemical Industries, Ltd., reagent, melting point: 115° C.) | 0 | 0 | 0 | 0 | 0 | 0 | 0 | 0 | 0 | 0.3 | 0.3 | 0.3 | 0.3 | 0.3 |

(Production of Laminated Sheet)

Production Example 1

The resin composition (a) was melt-kneaded in an extruder set to 230° C., then supplied to an extrusion die set to 250° C., and extruded into a sheet, which was then cooled to 60° C. with a cooling apparatus to obtain an unstretched sheet. This unstretched sheet was heated to 145° C. and stretched at a ratio of 5 in the longitudinal direction through the use of difference in peripheral speed among roll groups to obtain a uniaxially stretched film. Subsequently, the resin composition (b) was melt-kneaded in an extruder set to 250° C., then extruded into a sheet in an extrusion die, and laminated onto the back surface of the uniaxially stretched film. Also, the resin composition (b) and the resin composition (e) were each melt-kneaded in an extruder set to 250° C., then laminated to each other in an extrusion die, and extruded into a sheet, which was then laminated onto the surface of the uniaxially stretched film such that the resin composition (e) was located on the external side to obtain a laminate having the same 4-layer structure as the structure shown in FIG. 2.

The obtained laminate having a 4-layer structure was cooled to 60° C., and heated again to 150° C. using a tenter oven, stretched at a ratio of 9 in the lateral direction, and then further heated to 160° C. in an oven for heat treatment. Subsequently, the sheet was cooled to 60° C., and the edge part was slit to obtain a laminated sheet having a 4-layer structure (layer configuration: e/b/a/b, layer thickness: 5/10/60/15 µm, respectively, the number of layer stretching axes: uniaxial/uniaxial/biaxial/uniaxial, respectively). This sheet had a thickness of 90 µm and had a surface resistivity of $10^{15}\Omega$ units on both the surfaces. As a result of measuring the pore shape of the core layer (A) by the cross-sectional observation of this sheet, the porosity was 45%, the number of pore interfaces was 400 interfaces/mm, the average pore height of the core layer (A) was 4.0 µm, and the aspect ratio was 19 in the machine direction (MD) of the sheet and 23 in the transverse direction (TD) of the sheet. These measurement results are shown in Table 2.

Production Examples 3 to 11, 14 and 15

Each laminated sheet having a 4-layer structure was obtained in the same way as in Production Example 1 except that the resin compositions described in Table 2 were used instead of the resin compositions (a), (b) and (e), respectively.

The porosity, the number of pore interfaces, average pore height and aspect ratio of the core layer (A) were measured by cross-sectional observation in the same way as in Production Example 1. The measurement results are shown in Table 2.

Production Example 2

The resin composition (c) was melt-kneaded in an extruder set to 230° C., then supplied to an extrusion die set to 250° C., and extruded into a sheet, which was then cooled to 60° C. with a cooling apparatus to obtain an unstretched sheet. The obtained unstretched sheet was heated to 145° C. and stretched at a ratio of 5 in the longitudinal direction through the use of difference in peripheral speed among roll groups to obtain a uniaxially stretched film. Subsequently, the resin composition (d) was melt-kneaded in an extruder set to 250° C., then extruded into a sheet in an extrusion die, and laminated onto the back surface of the uniaxially stretched film. Also, the resin composition (d) was melt-kneaded in an extruder set to 250° C., then extruded into a sheet in an extrusion die, and laminated onto the surface of the uniaxially stretched film to obtain a laminate having a 3-layer structure.

The obtained laminate having a 3-layer structure was cooled to 60° C., and heated again to 150° C. using a tenter oven, stretched at a ratio of 9 in the lateral direction, and then further heated to 160° C. in an oven for heat treatment. Subsequently, the sheet was cooled to 60° C., and the edge part was slit to obtain a laminated sheet having a 3-layer structure (layer configuration: d/c/d, layer thickness: 17/46/17 µm, respectively, the number of layer stretching axes: uniaxial/biaxial/uniaxial, respectively). This sheet had a thickness of 80 µm and had a surface resistivity of $10^{15}\Omega$ units on both the surfaces. As a result of measuring the pore shape of the core layer (A) by the cross-sectional observation of this sheet, the porosity was 30%, the number of pore interfaces was 680 interfaces/mm, the average pore height of the core layer (A) was 2.1 µm, and the aspect ratio was 17 in the machine direction (MD) of the sheet and 20 in the transverse direction (TD) of the sheet. These measurement results are shown in Table 2.

Production Example 12

The resin composition (h), the resin composition (a) and the resin composition (e) were each separately melt-kneaded in two extruders set to 230° C., then supplied to one coextrusion die set to 230° C., laminated inside the die, and then extruded into a sheet, which was then cooled to 60° C. with a cooling apparatus to obtain an unstretched sheet. This unstretched sheet was heated to 145° C. and stretched at a ratio of 5 in the longitudinal direction through the use of difference in peripheral speed among roll groups to obtain a uniaxially stretched film. The obtained uniaxially stretched film was cooled to 60° C., and heated again to 150° C. using a tenter oven, stretched at a ratio of 9 in the lateral direction, and then further heated to 160° C. in an oven for heat treatment. Subsequently, the sheet was cooled to 60° C., and the edge part was slit to obtain a laminated sheet having a 3-layer structure (layer configuration: h/a/e, layer thickness: 2/60/2 µm, respectively, the number of layer stretching axes: biaxial/biaxial/biaxial, respectively).

The porosity, the number of pore interfaces, average pore height and aspect ratio of the core layer (A) were measured by cross-sectional observation in the same way as in Production Example 1. The measurement results are shown in Table 2.

Production Example 13

A laminated sheet having a 3-layer structure was obtained in the same way as in Production Example 2 except that: the thickness of the core layer (A) was set to 60 µm; the longitudinal stretching temperature for the unstretched sheet was set to 130° C.; and the lateral stretching temperature for the laminate having a 3-layer structure was changed to 140° C. The porosity, the number of pore interfaces, average pore height and aspect ratio of the core layer (A) were measured as to the obtained resin sheet by cross-sectional observation in the same way as in Production Example 1. The measurement results are shown in Table 2.

TABLE 2

| | Layer configuration | | Pore shape of core layer | | | | |
|---|---|---|---|---|---|---|---|
| | | | | The number | | | |
| Production Example of laminated sheet | Resin composition | Thickness (each layer) [µm] | Porosity [%] | of interfaces [interfaces/mm] | Average height [µm] | Aspect ratio MD | TD |
| Production Example 1 | e/b/a/b | 90(5/10/60/15) | 45.0 | 400 | 4.0 | 19 | 23 |
| Production Example 3 | e/b/f/b | 90(5/10/60/15) | 43.0 | 420 | 3.8 | 19 | 23 |
| Production Example 4 | e/b/g/b | 90(5/10/60/15) | 46.0 | 400 | 4.0 | 20 | 24 |
| Production Example 5 | e/h/a/h | 90(5/10/60/15) | 45.0 | 400 | 4.0 | 19 | 23 |
| Production Example 6 | i/h/g/h | 90(5/10/60/15) | 45.0 | 400 | 4.1 | 19 | 23 |
| Production Example 7 | j/h/g/h | 90(5/10/60/15) | 45.0 | 410 | 4.0 | 19 | 24 |

TABLE 2-continued

| Production Example of laminated sheet | Layer configuration | | Porosity [%] | Pore shape of core layer | | Aspect ratio | |
|---|---|---|---|---|---|---|---|
| | Resin composition | Thickness (each layer) [μm] | | The number of interfaces [interfaces/mm] | Average height [μm] | MD | TD |
| Production Example 8 | k/h/g/h | 90(5/10/60/15) | 45.0 | 420 | 4.2 | 19 | 23 |
| Production Example 9 | l/h/g/h | 90(5/10/60/15) | 45.0 | 400 | 3.9 | 20 | 23 |
| Production Example 10 | e/h/a/h | 70(2/3/60/5) | 45.0 | 400 | 4.2 | 20 | 23 |
| Production Example 11 | e/h/a/h | 160(5/45/60/50) | 45.0 | 380 | 3.8 | 20 | 23 |
| Production Example 14 | j/h/m/h | 90(5/10/60/15) | 45.0 | 400 | 4.0 | 20 | 24 |
| Production Example 15 | j/h/n/h | 90(5/10/60/15) | 44.0 | 390 | 3.9 | 19 | 23 |
| Production Example 2 | d/c/d | 80(—/17/46/17) | 30.0 | 680 | 2.1 | 17 | 20 |
| Production Example 12 | h/a/e | 64(2/60/2) | 45.0 | 420 | 4.3 | 19 | 23 |
| Production Example 13 | d/c/d | 94(—/17/60/17) | 45.0 | 720 | 2.0 | 16 | 19 |

(Production of Electret-Treated Sheet)

Examples 1 to 12 and Comparative Examples 1 to 3

In an electret treatment apparatus having a configuration similar to that shown in FIG. 3, the inter-probe distance of a main electrode was set to 10 μmm, and the main electrode-earth electrode distance was set to 10 mm. The laminated sheet obtained in Production Example 1 was placed on the earth electrode disk such that the back surface came into contact with the earth electrode side. Subsequently, charge was injected to the laminated sheet at applied voltage shown in Table 3 to obtain an electret-treated sheet of Example 1. Also, electret-treated sheets of Examples 2 to 12 were obtained in the same way as in Example 1 except that the laminated sheets obtained in Production Examples 3 to 11, 14 and 15 were used. Further, electret-treated sheets of Comparative Examples 1 to 3 were obtained in the same way as in Example 1 except that the laminated sheets obtained in Production Examples 2, 12 and 13 were used.

(Evaluation)

<Heat Sealability>

Two electret-treated sheets of each of Examples and Comparative Examples were laid on each other such that their heat seal layers were in contact. The sheets were held by a heat gradient tester (TYPE HG-100, manufactured by Toyo Seiki Seisaku-sho, Ltd.) and pressure-bonded for 5 seconds by temperature setting from 90 to 140° C. at intervals of 10° C. From the temperature at which the two electret-treated sheets were attached, the heat sealability was determined according to the following evaluation criteria.

A: The sheets were attached at 90° C. or higher and lower than 120° C.

B: The sheets were attached at 120° C. or higher and lower than 130° C. (lower limit for practical use).

C: The sheets were not attached at 140° C. (unsuitable for practical use).

<Water Vapor Permeability Coefficient>

The electret-treated sheet of each of Examples and Comparative Examples was measured under conditions of 40° C. and 90% RH by the dish method in accordance with JIS-Z-0208. The water vapor permeability coefficient (g·mm/m$^2$·24 hr) was determined from the obtained water vapor transmission rate (g/(m$^2$·24 hr)) and the thickness (mm) of the film.

<Water Resistance Test>

Difference in potential before and after washing and a decay rate were measured for the electret-treated sheet of each of Examples and Comparative Examples as described below. The measurement results are shown in Table 3.

Difference in potential before washing: the electret-treated sheet was placed on an aluminum plate, and surface charge was removed with a static elimination brush, followed by surface potential measurement.

Difference in potential after washing: the electret-treated sheet was dipped in ion-exchange water retained in a container, left standing for 1 μminute, and then taken out thereof. Excess water was wiped off with tissue paper, and the sheet was hung to dry for 24 hours under conditions involving a temperature of 23° C. and a relative humidity of 50%. The resulting sample was placed on an aluminum plate, and surface charge was removed with a static elimination brush, followed by surface potential measurement.

Decay rate: {(Difference in potential before washing)−(Difference in potential after washing)}×100/(Difference in potential before washing)

At the time of the surface potential measurement described above, the aluminum plate was used as earth, and the surface potential was measured at 5 points each of the surface and back surface of the electret-treated sheet on the aluminum plate such that the interval between a probe of a surface electrometer (manufactured by Kasuga Denki, Inc., product name: KSD-3000) and the sheet surface was 1 cm. The 5 μmeasurement values each of the surface and the back surface were averaged, and difference in the obtained average value between the surface and the back surface was determined as the difference in potential.

TABLE 3

| Electret-treated sheet | Laminated sheet | Heat sealability | Water vapor permeability coefficient [g·mm/m²·24 hr] | Applied voltage [kV] | Water resistance test | | |
|---|---|---|---|---|---|---|---|
| | | | | | Difference in potential before water washing [V] | Difference in potential after water washing [V] | Decay rate [%] |
| Example 1 | Production Example 1 | A | 0.22 | 15 | 2100 | 1000 | 52 |
| Example 2 | Production Example 3 | A | 0.24 | 15 | 2200 | 900 | 59 |
| Example 3 | Production Example 4 | A | 0.22 | 15 | 2000 | 1000 | 50 |
| Example 4 | Production Example 5 | A | 0.23 | 15 | 2100 | 1200 | 43 |
| Example 5 | Production Example 6 | B | 0.20 | 15 | 2200 | 1600 | 27 |
| Example 6 | Production Example 7 | A | 0.21 | 18 | 2150 | 1450 | 33 |
| Example 7 | Production Example 8 | A | 0.18 | 16 | 2100 | 1500 | 29 |
| Example 8 | Production Example 9 | A | 0.15 | 15 | 2200 | 1550 | 30 |
| Example 11 | Production Example 14 | A | 0.21 | 16 | 2100 | 1450 | 31 |
| Example 12 | Production Example 15 | A | 0.22 | 16 | 2080 | 1390 | 33 |
| Example 9 | Production Example 10 | A | 0.20 | 18 | 2150 | 1100 | 49 |
| Example 10 | Production Example 11 | A | 0.19 | 23 | 2300 | 1050 | 54 |
| Comparative Example 1 | Production Example 2 | C | 0.24 | 15 | 2200 | 300 | 86 |
| Comparative Example 2 | Production Example 12 | A | 0.22 | 18 | 2100 | 400 | 81 |
| Comparative Example 3 | Production Example 13 | C | 8.95 | 15 | 1100 | 150 | 86 |

(Production of Filter)

Figure 5:
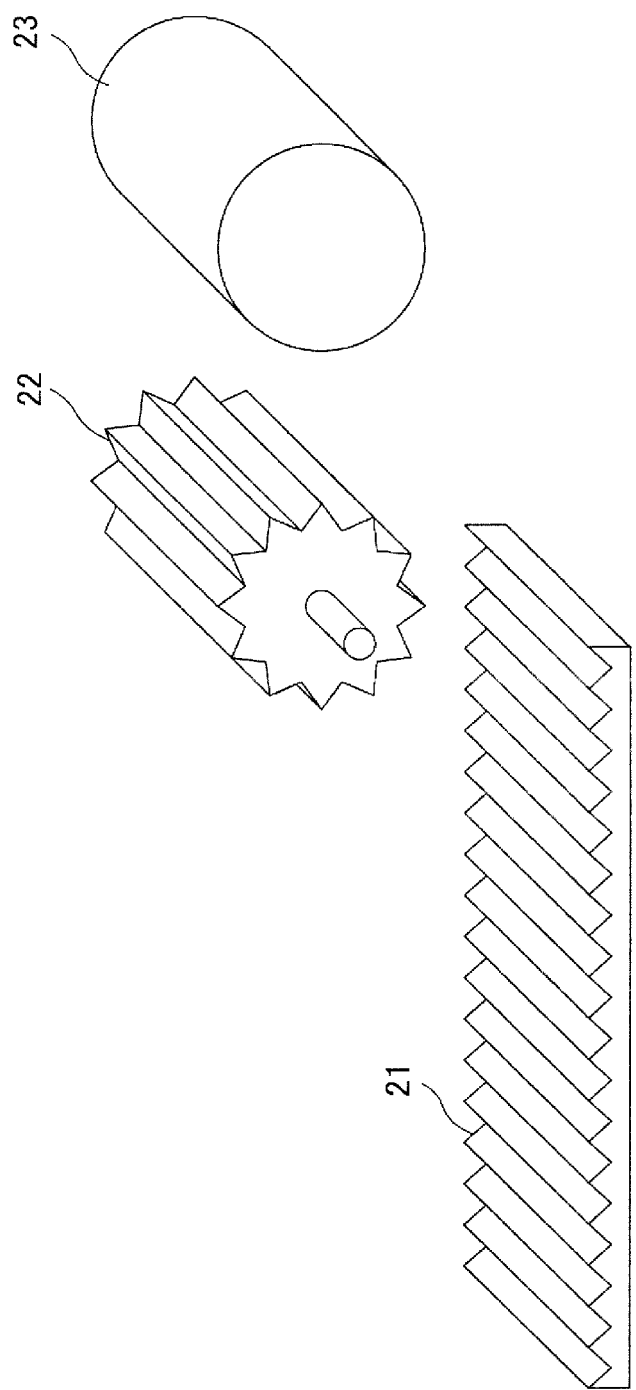
FIG. 5 is a diagram showing one example of a corrugation processing apparatus.

As shown in FIG. 5, metal rack gear 21 (rack pitch: 3.0 μmm, rack height: 3.5 μmm), metal pinion gear 22 and pressure roll 23 were used. The laminated sheets of Production Examples 1 and 2 were subjected to corrugation processing as described below to obtain 20 corrugated sheets each.

Figure 6:
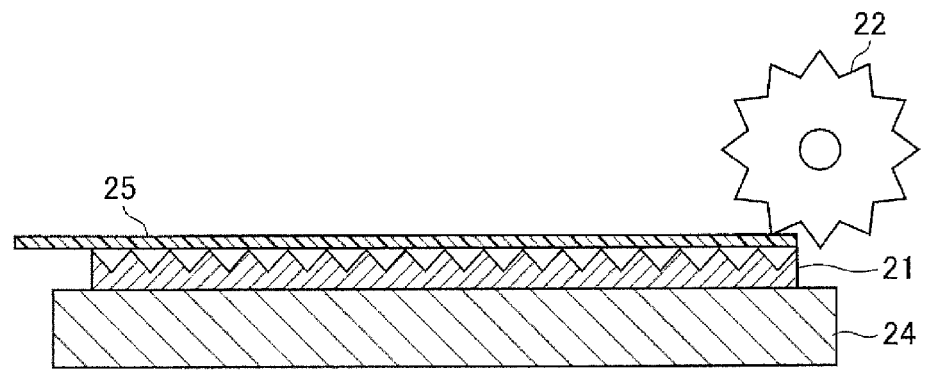
FIG. 6 is a diagram showing a laminated sheet for flutes before processing.
Figure 7:
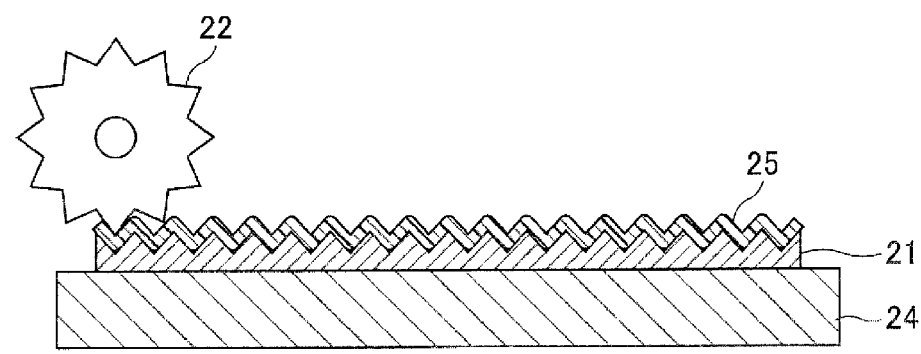
FIG. 7 is a diagram showing a laminated sheet for flutes processed into a corrugated plate-like form.
Figure 8:
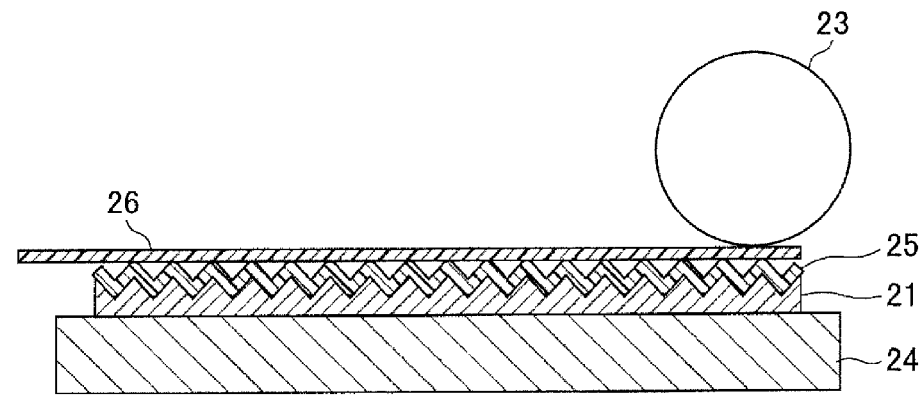
FIG. 8 is a diagram showing a flat plate-like laminated sheet for liners laminated on the laminated sheet for flutes processed into a corrugated plate-like form.

At the time of the corrugation processing, as shown in FIG. 6, the rack gear 21 was placed on hot plate 24 and heated such that the surface temperature of the rack gear 21 was 120° C. 10 cm wide and 20 cm long laminated sheet 25 for flutes was placed on the rack gear 21. Subsequently, as shown in FIG. 7, the pinion gear 22 heated to 60° C. in an oven was rolled over with a hand to change the shape of the laminated sheet 25 for flutes into a shape similar to the surface shape of the rack gear 21. As shown in FIG. 8, 10 cm wide and 15 cm long laminated sheet 26 for liners was placed on the laminated sheet 25 for flutes having the shape changed in advance, and the pressure roll 23 heated to 60° C. in an oven was rolled out with a hand to thermally fuse the laminated sheets to each other. The laminated sheet of Production Example 1 was processed with the layer of the resin composition (e) positioned downside both for the laminated sheet 25 for flutes and for the laminated sheet 26 for liners.

Next, in an electret treatment apparatus having a configuration similar to that shown in FIG. 3, the inter-probe distance of a main electrode was set to 10 μmm, and the main electrode-earth electrode distance was set to 10 mm. The corrugated sheet was placed on the earth electrode disk such that the flat surface came into contact with the earth electrode side. Charge was injected to the corrugated sheet at applied voltage of 20 kV. All 20 corrugated sheets were laminated, and then cut with a hot wire cutter set to approximately 200° C. while thermally fused such that the thickness was 20 μmm to produce a filter.

The laminated sheets of Production Examples 1 and 3 to 12, 14 and 15 were able to be processed without any problem in the corrugation processing, the electret processing, and the thermal fusing and cutting processing. On the other hand, the laminated sheets of Production Examples 2 and 13 were unable to produce a filter because the sheets were separated due to failure in thermal fusing during the corrugation processing.

The present application claims the priorities of Japanese Patent Application No. 2018-068731 filed on Mar. 30, 2018 and Japanese Patent Application No. 2018-143512 filed on Jul. 31, 2018, the contents of which are incorporated herein by reference in their entirety.

REFERENCE SIGNS LIST 11 and 12: electret-treated sheet
2: core layer (A)
3: heat seal layer (B)
4: back surface layer (Y)
4a: surface layer (X)
5: intermediate layer (C)

The invention claimed is:

1. An electret-treated sheet comprising:
a core layer (A) which is a porous film containing a thermoplastic resin and 0.07 to 10% by mass of metal soap;
a surface layer (X) disposed on one side of the core layer (A); and a back surface layer (Y) disposed on the other side of the core layer (A),
the surface layer (X) and the back surface layer (Y) each having a charged outermost surface, wherein:
the electret-treated sheet has a water vapor permeability coefficient of 0.1 to 2.5 g·mm/m²·24 hr;
the core layer (A) has a pore aspect ratio of 5 to 50 and an average pore height of 2.5 to 15 μm;
the surface layer (X) and the back surface layer (Y) each have a thickness of 5 to 200 μm; and
the surface layer (X) comprises a heat seal layer (B) comprising the outermost surface, wherein
the heat seal layer (B) contains a polypropylene resin and has a melting point of 50 to 140° C., and
wherein the electret-treated sheet has a decay rate of 27 to 33 percent.

2. The electret-treated sheet according to claim 1, wherein the number of pore interfaces of the core layer (A) is 50 to 1000 interfaces/mm.

3. The electret-treated sheet according to claim 1, wherein the thermoplastic resin contained in the core layer (A) is polyolefin resin.

4. The electret-treated sheet according to claim 1, wherein the electret-treated sheet is a film stretched at least in a uniaxial direction.

5. The electret-treated sheet according to claim 1, wherein the core layer (A) contains at least one selected from an inorganic filler and an organic filler, wherein
the inorganic filler and the organic filler have a volume-average particle size of 0.1 to 30 μm.

6. A filter comprising an air flow path, wherein
a corrugated electret-treated sheet which is an electret-treated sheet according to any one of claims 1-3, 4, and 5, and a flat electret-treated sheet which is an electret-treated sheet according to any one of claims 1-3, 4, and 5, are alternately laminated, and
the filter has a joint at which the laminated electret-treated sheets are thermally fused to each other.

7. The electret-treated sheet according to claim 1, wherein a melting point of the metal soap is within a temperature range having a lower limit of 50° C. and an upper limit that is 50° C. higher than a melting point of the thermoplastic resin.

\* \* \* \* \*